(12) United States Patent
Tsujikawa et al.

(10) Patent No.: US 9,947,324 B2
(45) Date of Patent: Apr. 17, 2018

(54) SPEAKER IDENTIFICATION METHOD AND SPEAKER IDENTIFICATION DEVICE

(71) Applicant: Panasonic Corporation, Osaka (JP)

(72) Inventors: Misaki Tsujikawa, Shiga (JP); Tomoko Matsui, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 6 days.

(21) Appl. No.: 15/130,944

(22) Filed: Apr. 16, 2016

(65) Prior Publication Data
US 2016/0314790 A1 Oct. 27, 2016

(30) Foreign Application Priority Data

Apr. 22, 2015 (JP) .................... 2015-087625

(51) Int. Cl.
G10L 15/00 (2013.01)
G10L 17/06 (2013.01)
G10L 17/04 (2013.01)

(52) U.S. Cl.
CPC .............. *G10L 17/06* (2013.01); *G10L 17/04* (2013.01)

(58) Field of Classification Search
USPC ................... 704/239, 246, 247, 251, 252
See application file for complete search history.

(56) References Cited

U.S. PATENT DOCUMENTS

| 6,088,669 A * | 7/2000 | Maes | G10L 17/00 704/231 |
| 2003/0171931 A1* | 9/2003 | Chang | G10L 15/07 704/275 |
| 2009/0119103 A1* | 5/2009 | Gerl | G10L 17/04 704/243 |
| 2010/0004931 A1* | 1/2010 | Ma | G10L 15/08 704/244 |
| 2010/0268537 A1* | 10/2010 | Al-Telmissani | G10L 17/04 704/246 |
| 2011/0202340 A1* | 8/2011 | Ariyaeeinia | G10L 17/20 704/233 |
| 2014/0075570 A1* | 3/2014 | Hsu | G06F 21/32 726/28 |

FOREIGN PATENT DOCUMENTS

| JP | 1-161399 | 6/1989 |
| JP | 11-344992 | 12/1999 |

* cited by examiner

*Primary Examiner* — Leonard Saint Cyr
(74) *Attorney, Agent, or Firm* — Greenblum & Bernstein, P.L.C.

(57) ABSTRACT

A first similarity degree processor calculates first similarity degrees between a feature value in voice signal of each of first speakers and each feature value in a plurality of unspecified speaker models of a plurality of unspecified speakers. The processor specifies a plurality of the unspecified speaker models for which the first similarity degrees are equal to or greater than a prescribed value. The processor also associates and stores each of the first speakers and the specified unspecified speaker models. Additionally, the processor calculates, for each of the first speakers, a plurality of second similarity degrees between a feature value in a voice signal of a second speaker and each feature values in the unspecified speaker models associated with the first speakers and stored in a second speaker model storage. The processor further specifies the second speaker based on the second similarity degrees.

10 Claims, 14 Drawing Sheets

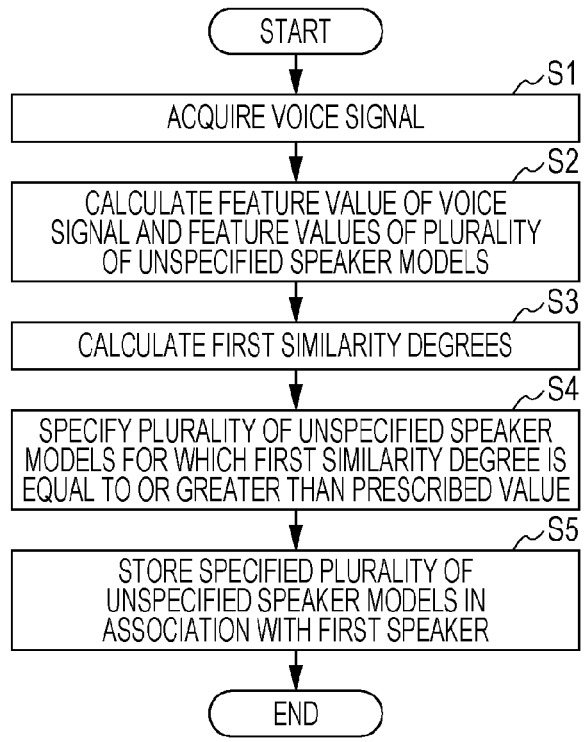
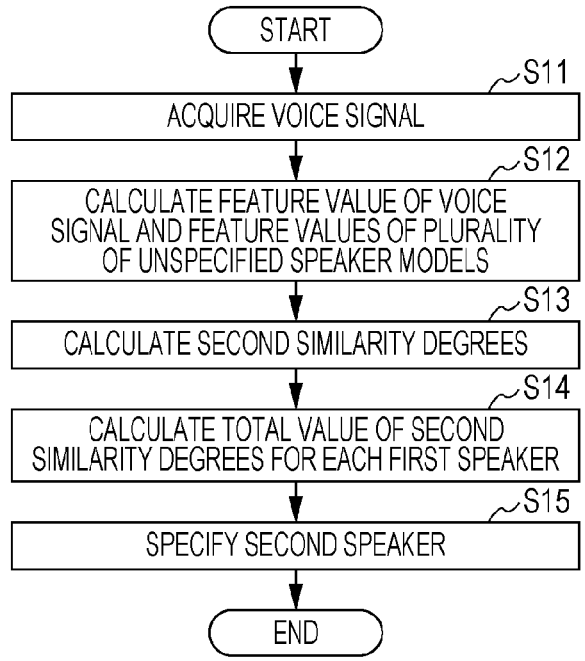

SPEAKER IDENTIFICATION METHOD AND SPEAKER IDENTIFICATION DEVICE

BACKGROUND

1. Technical Field

The present disclosure relates to a speaker identification method and a speaker identification device with which a speaker is identified on the basis of an acquired voice signal.

2. Description of the Related Art

In speaker identification, generally speaking, there is a technique in which the voice of the person in question is collected in advance and learned to generate a model. Furthermore, in voice recognition, there is a technique in which the voices of other people are used for speaker adaptation.

For example, in a voice dictionary creation method disclosed in Japanese Unexamined Patent Application Publication No. 11-344992, voice data of a new registered user is captured and the features thereof are extracted, the unspecified speaker voice dictionary that is the closest to the extracted features is selected from among a plurality of unspecified speaker voice dictionaries created in advance according to voice feature factors such as gender, age, and voice pitch, and the selected unspecified speaker voice dictionary is adapted on the basis of the voice data of the new registered user, thereby creating a personal voice dictionary for the new registered user.

Furthermore, for example, in a speaker adaptation method in a voice recognition device disclosed in Japanese Unexamined Patent Application Publication No. 1-161399, in accordance with information on the distance between voice patterns of an initial standard pattern set that is configured from the voices of a plurality of speakers for all recognition-target vocabulary and a voice pattern of a user, one or more voice patterns that are close to the voice pattern of the user are selected from within the standard pattern set for each item of vocabulary, and these serve as a standard pattern set for the user.

SUMMARY

In one general aspect, the techniques disclosed here feature a speaker identification method that includes: learning mode processing in which a first database, in which a plurality of unspecified speakers and a plurality of unspecified speaker models obtained by modeling features of the voices of the plurality of unspecified speakers are associated and stored, is used to create a second database, in which first speakers who are not stored in the first database and a plurality of the unspecified speaker models are associated and stored; and identification mode processing in which the second database is used to identify a second speaker, in which, in the learning mode processing, voice signal of each of the first speakers is acquired, first similarity degrees between a feature value in the acquired voice signal of each of the first speakers and each feature value in the plurality of unspecified speaker models stored in the first database are calculated, a plurality of the unspecified speaker models for which the calculated first similarity degrees are equal to or greater than a prescribed value are specified, and each of the first speakers and the specified plurality of unspecified speaker models are associated and stored in the second database, and in the identification mode processing, a voice signal of the second speaker is acquired, a plurality of second similarity degrees between a feature value in the acquired voice signal of the second speaker and each feature value in the plurality of unspecified speaker models associated with the first speakers and stored in the second database are calculated for each of the first speakers, and one of the first speakers stored in the second database who corresponds to the second speaker is specified based on the calculated plurality of second similarity degrees.

According to the present disclosure, it is possible to identify an identification target speaker with even greater precision even in the case where a speaker model for the speaker has not been created.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a flowchart for describing a learning mode processing operation of the speaker identification device in embodiment 1;

FIG. 3 is a flowchart for describing an identification mode processing operation of the speaker identification device in embodiment 1;

DETAILED DESCRIPTION

Figure 1:
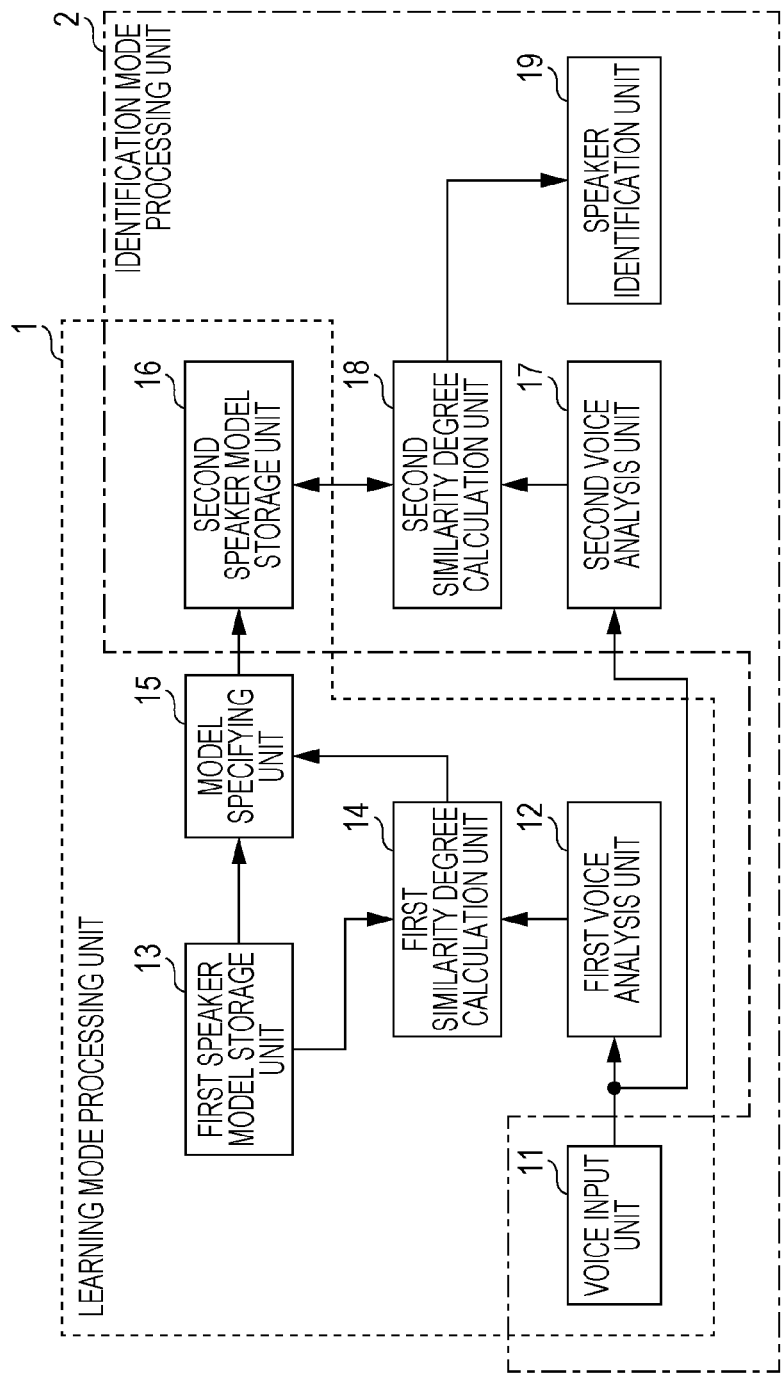
FIG. 1 is a drawing depicting a configuration of a speaker identification device in embodiment 1.

Findings Forming the Basis of the Present Disclosure

In conventional speaker identification, in the case where there is not much speech of an identification target speaker, the amount of data is insufficient, and therefore there is a problem in that it is not possible to create an optimum speaker model by learning and there is a decline in the precision with which the speaker is identified.

In Japanese Unexamined Patent Application Publication No. 11-344992, in speaker identification in which the vocabulary is not restricted, matching scores fluctuate greatly due to differences in vocabulary, shortness of speech sentences, and so forth, and the precision of speaker identification is liable to decline.

Furthermore, in Japanese Unexamined Patent Application Publication No. 1-161399, distances are merely calculated for a plurality of patterns, and the word having the shortest distance is distinguished as a recognition result for an input voice to be recognized. Therefore, in the case where a voice including unknown vocabulary is input, the precision of voice recognition is liable to decline.

The present disclosure has been devised in order to solve the aforementioned problems, and provides a speaker identification method and a speaker identification device with which it is possible to identify an identification target speaker with even greater precision even in the case where a speaker model for the speaker has not been created.

A speaker identification method according to an aspect of the present disclosure includes: learning mode processing in which a first database, in which a plurality of unspecified speakers and a plurality of unspecified speaker models obtained by modeling features of the voices of the plurality of unspecified speakers are associated and stored, is used to create a second database, in which first speakers who are not stored in the first database and a plurality of the unspecified speaker models are associated and stored; and identification mode processing in which the second database is used to identify a second speaker, in which, in the learning mode processing, voice signal of each of the first speakers is acquired, first similarity degrees between a feature value in the acquired voice signal of each of the first speakers and each feature value in the plurality of unspecified speaker models stored in the first database are calculated, a plurality of the unspecified speaker models for which the calculated first similarity degrees are equal to or greater than a prescribed value are specified, and each of the first speakers and the specified plurality of unspecified speaker models are associated and stored in the second database, and in the identification mode processing, a voice signal of the second speaker is acquired, a plurality of second similarity degrees between a feature value in the acquired voice signal of the second speaker and each feature value in the plurality of unspecified speaker models associated with the first speakers and stored in the second database are calculated for each of the first speakers, and one of the first speakers stored in the second database who corresponds to the second speaker is specified based on the calculated plurality of second similarity degrees.

According to this configuration, in the learning mode processing, voice signal of each of first speakers is acquired. First similarity degrees between a feature value in the acquired voice signal of each of the first speakers and each feature value in the plurality of unspecified speaker models stored in the first database are calculated. A plurality of the unspecified speaker models for which the calculated first similarity degrees are equal to or greater than a prescribed value are specified. Each of the first speakers and the specified plurality of unspecified speaker models are associated and stored in the second database. In the identification mode processing, a voice signal of a second speaker is acquired. A plurality of second similarity degrees between a feature value in the acquired voice signal of the second speaker and each feature value in the plurality of unspecified speaker models associated with the first speakers and stored in the second database are calculated for each of the first speakers. One of the first speakers stored in the second database who corresponds to the second speaker is specified based on the calculated plurality of second similarity degrees.

Consequently, the second speaker is identified using the speaker models of a plurality of unspecified speakers similar to the voice signals of the first speakers, and therefore it is possible to identify an identification target speaker with even greater precision even in the case where a speaker model for the speaker has not been created.

Furthermore, in the aforementioned speaker identification method, a total value obtained by totaling the calculated plurality of second similarity degrees may be calculated for each of the first speakers, and the one of the first speakers stored in the second database who corresponds to the second speaker may be specified based on the calculated total value.

According to this configuration, a total value obtained by totaling the calculated plurality of second similarity degrees is calculated for each of the first speakers, and the one of the first speakers stored in the second database who corresponds to the second speaker is specified based on the calculated total values.

Consequently, the second speaker is specified based on a total value obtained by totaling the plurality of second similarity degrees, and therefore it is possible to suppress fluctuation in the second similarity degrees caused by differences in vocabulary, shortness of speech sentences, and so forth, and it is possible to identify a speaker with even greater precision.

Furthermore, in the aforementioned speaker identification method, the calculated plurality of second similarity degrees may be corrected by multiplying each of the plurality of second similarity degrees by a weighting value that corresponds to a ranking of the first similarity degrees, a total value obtained by totaling the corrected plurality of second similarity degrees may be calculated for each of the first speakers, and the one of the first speakers stored in the second database who corresponds to the second speaker may be specified based on the calculated total value.

According to this configuration, the calculated plurality of second similarity degrees are corrected by multiplying each of the plurality of second similarity degrees by a weighting value that corresponds to the ranking of the first similarity degrees. A total value obtained by totaling the corrected plurality of second similarity degrees is calculated for each of the first speakers, and the one of the first speakers stored in the second database who corresponds to the second speaker is specified based on the calculated total values.

Consequently, the plurality of second similarity degrees are corrected by each of the plurality of second similarity degrees being multiplied by a weighting value that corresponds to the ranking of the first similarity degrees, and therefore it is possible to suppress fluctuation in the second similarity degrees caused by differences in vocabulary, shortness of speech sentences, and so forth, and it is possible to identify a speaker with even greater precision.

Furthermore, in the aforementioned speaker identification method, the weighting value may increase as the first similarity degrees increase.

According to this configuration, the weighting value increases as the first similarity degrees increase, and therefore it is possible to suppress fluctuation in the second similarity degrees caused by differences in vocabulary, shortness of speech sentences, and so forth.

Furthermore, in the aforementioned speaker identification method, the calculated plurality of second similarity degrees may be corrected by multiplying each of the plurality of second similarity degrees by a first similarity degree, a total value obtained by totaling the corrected plurality of second similarity degrees may be calculated for each of the first speakers, and the one of the first speakers stored in the second database who corresponds to the second speaker may be specified based on the calculated total value.

According to this configuration, the calculated plurality of second similarity degrees are corrected by multiplying each of the plurality of second similarity degrees by a first similarity degree. A total value obtained by totaling the corrected plurality of second similarity degrees is calculated for each of the first speakers, and the one of the first speakers stored in the second database who corresponds to the second speaker is specified based on the calculated total values.

Consequently, the plurality of second similarity degrees are corrected by each of the plurality of second similarity degrees being multiplied by a first similarity degree, and therefore it is possible to suppress fluctuation in the second similarity degrees caused by differences in vocabulary, shortness of speech sentences, and so forth, and it is possible to identify a speaker with even greater precision.

Furthermore, in the aforementioned speaker identification method, a total value obtained by totaling the plurality of second similarity degrees that are equal to or greater than a prescribed value from among the calculated plurality of second similarity degrees may be calculated for each of the first speakers, and the one of the first speakers stored in the second database who corresponds to the second speaker may be specified based on the calculated total value.

According to this configuration, a total value obtained by totaling the plurality of second similarity degrees that are equal to or greater than a prescribed value from among the calculated plurality of second similarity degrees is calculated for each of the first speakers, and the one of the first speakers stored in the second database who corresponds to the second speaker is specified based on the calculated total values.

Consequently, a plurality of second similarity degrees that are equal to or greater than the prescribed value are totaled, the second similarity degrees that are less than the prescribed value are not taken into consideration, and therefore it is possible to identify a speaker with even greater precision.

Furthermore, in the aforementioned speaker identification method, the second speaker may be specified as the first speaker stored in the second database having the highest calculated total value.

According to this configuration, the second speaker is specified as the one of the first speakers stored in the second database having the highest calculated total value, and therefore it is possible to easily identify a speaker.

Furthermore, in the aforementioned speaker identification method, in the learning mode processing, speaker models corresponding to the first speakers may be newly created based on the specified plurality of unspecified speaker models and the acquired voice signals of the first speakers, and the created speaker models may be associated with the first speakers and stored in a third database, and in the identification mode processing, for each first speaker, a third similarity degree between a feature value in the acquired voice signal of the second speaker and a feature value in the speaker model associated with the first speaker and stored in the third database may be calculated, and one of the first speakers stored in the third database who corresponds to the second speaker may be specified based on the calculated third similarity degrees.

According to this configuration, in the learning mode processing, speaker models corresponding to the first speakers are newly created based on the specified plurality of unspecified speaker models and the acquired voice signals of the first speakers. The created speaker models are associated with the first speakers and stored in a third database. In the identification mode processing, for each first speaker, a third similarity degree between a feature value in the acquired voice signal of the second speaker and a feature value in the speaker model associated with the first speaker and stored in the third database is calculated. One of the first speakers stored in the third database who corresponds to the second speaker is specified based on the calculated third similarity degrees.

Consequently, new speaker models that correspond to first speakers are created using a plurality of speaker models of other people similar to the acquired voice signal of each of the first speakers, and therefore it is possible to identify a speaker with even greater precision using the newly created speaker models.

Furthermore, in the aforementioned speaker identification method, in the case where the second speaker is not specified as being any of the first speakers stored in the third database, the plurality of second similarity degrees between the feature value in the acquired voice signal of the second speaker and each feature value in the plurality of unspecified speaker models associated with the first speakers and stored in the second database may be calculated for each of the first speakers, and which of the first speakers stored in the second database corresponds to the second speaker may be specified based on the calculated plurality of second similarity degrees.

According to this configuration, in the case where the second speaker is not specified as being any of the first speakers stored in the third database, the plurality of second similarity degrees between the feature value in the acquired voice signal of the second speaker and each feature value in the plurality of unspecified speaker models associated with the first speakers and stored in the second database are calculated for each of the first speakers. Which of the first speakers stored in the second database corresponds to the second speaker is specified based on the calculated plurality of second similarity degrees.

Consequently, in the case where the second speaker cannot be specified using the new speaker models that have been created using a plurality of speaker models of other people similar to the acquired voice signals of the first speakers, the second speaker can be identified using the speaker models of a plurality of unspecified speakers similar to the voice signals of the first speakers.

Furthermore, in the aforementioned speaker identification method, after the identification mode processing has been performed, the first similarity degrees corresponding to each of the unspecified speaker models calculated in the learning mode processing and the second similarity degrees corresponding to each of the unspecified speaker models calculated in the identification mode processing may be compared, and in the case where there is a prescribed number or more of the unspecified speaker models for which the difference between the first similarity degrees and the second similarity degrees is equal to or greater than a prescribed value, the learning mode processing may be performed again.

According to this configuration, after the identification mode processing has been performed, the first similarity degrees corresponding to each of the unspecified speaker models calculated in the learning mode processing and the second similarity degrees corresponding to each of the unspecified speaker models calculated in the identification mode processing are compared. In the case where there is a prescribed number or more of the unspecified speaker models for which the difference between the first similarity degrees and the second similarity degrees is equal to or greater than a prescribed value, the learning mode processing is performed again.

Consequently, in the case where there is a considerable difference between the first similarity degrees calculated in the learning mode processing and the second similarity degrees calculated in the identification mode processing, by performing the learning mode processing again, it is possible to specify a plurality of unspecified speaker models that are more similar to the first speakers, and it is possible to identify a speaker with even greater precision.

Furthermore, in the aforementioned speaker identification method, after the identification mode processing has been performed, the first similarity degrees corresponding to each of the unspecified speaker models calculated in the learning mode processing and the second similarity degrees corresponding to each of the unspecified speaker models calculated in the identification mode processing may be compared, and in the case where there is a prescribed number or more of the unspecified speaker models for which the difference between the first similarity degrees and the second similarity degrees is equal to or greater than a prescribed value, the first similarity degrees corresponding to the unspecified speaker models stored in the second database for which the difference is equal to or greater than the prescribed value may be amended to the second similarity degrees calculated in the identification mode processing.

According to this configuration, after the identification mode processing has been performed, the first similarity degrees corresponding to each of the unspecified speaker models calculated in the learning mode processing and the second similarity degrees corresponding to each of the unspecified speaker models calculated in the identification mode processing are compared. In the case where there is a prescribed number or more of the unspecified speaker models for which the difference between the first similarity degrees and the second similarity degrees is equal to or greater than a prescribed value, the first similarity degrees corresponding to the unspecified speaker models stored in the second database for which the difference is equal to or greater than the prescribed value are amended to the second similarity degrees calculated in the identification mode processing.

Consequently, in the case where there is a considerable difference between the first similarity degrees calculated in the learning mode processing and the second similarity degrees calculated in the identification mode processing, by amending first similarity degrees to the second similarity degrees, it is possible to specify a plurality of unspecified speaker models that are more similar to the first speakers, and it is possible to identify a speaker with even greater precision.

A speaker identification device according to another aspect of the present disclosure is provided with: a learning mode processing unit that uses a first database, in which a plurality of unspecified speakers and a plurality of unspecified speaker models obtained by modeling features of the voices of the plurality of unspecified speakers are associated and stored, to create a second database, in which first speakers who are not stored in the first database and a plurality of the unspecified speaker models are associated and stored; and an identification mode processing unit that uses the second database to identify a second speaker, in which, the learning mode processing unit includes a first voice acquisition unit that acquires voice signal of each of the first speakers, a first similarity degree calculation unit that calculates first similarity degrees between a feature value in the voice signal of each of the first speakers acquired by the first voice acquisition unit and each feature value in the plurality of unspecified speaker models of a plurality of the unspecified speakers who are different from the first speakers and are stored in the first database, a first specifying unit that specifies a plurality of the unspecified speaker models for which the first similarity degrees calculated by the first similarity degree calculation unit are equal to or greater than a prescribed value, and a storage processing unit that associates and stores each of the first speakers and the plurality of unspecified speaker models specified by the first specifying unit in the second database, and the identification mode processing unit includes a second voice acquisition unit that acquires a voice signal of the second speaker, a second similarity degree calculation unit that calculates, for each of the first speakers, a plurality of second similarity degrees between a feature value in the voice signal of the second speaker acquired by the second voice acquisition unit and each feature value in the plurality of unspecified speaker models associated with the first speakers and stored in the second database, and a second specifying unit that, based on the plurality of second similarity degrees calculated by the second similarity degree calculation unit, specifies one of the first speakers stored in the second database who corresponds to the second speaker.

According to this configuration, in the learning mode processing, voice signal of each of first speakers is acquired. First similarity degrees between a feature value in the acquired voice signal of each the first speakers and each feature value in the plurality of unspecified speaker models stored in the first database are calculated. A plurality of the unspecified speaker models for which the calculated first similarity degrees are equal to or greater than a prescribed value are specified. Each of the first speakers and the specified plurality of unspecified speaker models are associated and stored in the second database. In the identification mode processing, a voice signal of a second speaker is acquired. A plurality of second similarity degrees between a feature value in the acquired voice signal of the second speaker and each feature value in the plurality of unspecified speaker models associated with the first speakers and stored in the second database are calculated for each of the first speakers. One of the first speakers stored in the second database who corresponds to the second speaker is specified based on the calculated plurality of second similarity degrees.

Consequently, the second speaker is identified using the speaker models of a plurality of unspecified speakers similar to the voice signals of the first speakers, and therefore it is possible to identify an identification target speaker with even greater precision even in the case where a speaker model for the speaker has not been created.

A speaker identification method according to another aspect of the present disclosure includes: learning mode processing in which a first database, in which a plurality of unspecified speakers and a plurality of unspecified speaker models obtained by modeling features of the voices of the plurality of unspecified speakers are associated and stored, is used to create a second database, in which first speakers who are not stored in the first database and a plurality of the unspecified speaker models are associated and stored; and identification mode processing in which the second database is used to identify a second speaker, in which, in the learning mode processing, voice signal of each of the first speakers is acquired, first similarity degrees between a feature value in the acquired voice signal of each of the first speakers and each feature value in the plurality of unspecified speaker models stored in the first database are calculated, a plurality of the unspecified speaker models for which the calculated first similarity degrees are equal to or greater than a prescribed value are specified, speaker model corresponding to each of the first speakers is newly created based on the specified plurality of the unspecified speaker models and the acquired voice signals of the first speakers, and the created speaker model is associated with the first speakers and stored in the second database, and in the identification mode processing, a voice signal of the second speaker is acquired, a plurality of second similarity degrees between a feature value in the acquired voice signal of the second speaker and feature values in the speaker models associated with the first speakers and stored in the second database are calculated for each of the first speakers, and one of the first speakers stored in the second database who corresponds to the second speaker is specified based on the calculated plurality of second similarity degrees.

According to this configuration, in the learning mode processing, voice signal of each of first speakers are acquired. First similarity degrees between a feature value in the acquired voice signal of each of the first speakers and each feature value in the plurality of unspecified speaker models stored in the first database are calculated. A plurality of the unspecified speaker models for which the calculated first similarity degrees are equal to or greater than a prescribed value are specified. Speaker model corresponding to each of the first speaker is newly created based on the specified plurality of the unspecified speaker models and the acquired voice signals of the first speakers. The created speaker model is associated with the first speakers and stored in the second database. In the identification mode processing, a voice signal of a second speaker is acquired. A plurality of second similarity degrees between a feature value in the acquired voice signal of the second speaker and feature values in the speaker models associated with the first speakers and stored in the second database are calculated for each of the first speakers. One of the first speakers stored in the second database who corresponds to the second speaker is specified based on the calculated plurality of second similarity degrees.

Consequently, new speaker models that correspond to first speakers are created using a plurality of speaker models of other people similar to the acquired voice signals of the first speakers, and therefore it is possible to identify a speaker with even greater precision using the newly created speaker models.

It should be noted that these comprehensive or specific aspects may be realized by a system, a method, a device, an integrated circuit, a computer program, or a recording medium such as a computer-readable CD-ROM, and may be realized by an arbitrary combination of a system, a method, a device, an integrated circuit, a computer program, or a recording medium.

Hereinafter, embodiments of the present disclosure will be described with reference to the appended drawings. It should be noted that the embodiments hereinafter are exemplary embodiments of the present disclosure, and do not limit the technical scope of the present disclosure.

Embodiment 1

FIG. 1 is a drawing depicting a configuration of a speaker identification device in the present embodiment 1. The speaker identification device is housed inside a television, a smartphone, a car navigation device, or the like.

The speaker identification device depicted in FIG. 1 is provided with a voice input unit 11, a first voice analysis unit 12, a first speaker model storage unit 13, a first similarity degree calculation unit 14, a model specifying unit 15, a second speaker model storage unit 16, a second voice analysis unit 17, a second similarity degree calculation unit 18, and a speaker identification unit 19.

Furthermore, a learning mode processing unit 1 is made up of the voice input unit 11, the first voice analysis unit 12, the first speaker model storage unit 13, the first similarity degree calculation unit 14, the model specifying unit 15, and the second speaker model storage unit 16. An identification mode processing unit 2 is made up of the voice input unit 11, the second speaker model storage unit 16, the second voice analysis unit 17, the second similarity degree calculation unit 18, and the speaker identification unit 19.

In learning mode processing, the learning mode processing unit 1 uses the first speaker model storage unit 13 (first database), in which a plurality of unspecified speakers and a plurality of unspecified speaker models obtained by modeling the features of the voices of the plurality of unspecified speakers are associated and stored, to create the second speaker model storage unit 16 (second database), in which first speakers who are not stored in the first speaker model storage unit 13 and a plurality of the unspecified speaker models are associated and stored.

The first speaker model storage unit 13 and the second speaker model storage unit 16 may each be a memory, for example, as the hardware configuration thereof. The memories are writable recording mediums such as a semiconductor memory or a hard disk.

In identification mode processing, the identification mode processing unit 2 uses the second speaker model storage unit 16 to identify a second speaker.

The speaker identification device in the present embodiment 1 may include a processor and a memory as the hardware configuration thereof. The memory may include programs corresponding to each of the learning mode processing unit 1 and the identification mode processing unit 2. The memory is a recording medium such as a semiconductor memory or a hard disk. The learning mode processing unit 1 and the identification mode processing unit 2 each function as a result of the processor executing the programs.

Alternatively, the speaker identification device in the present embodiment 1 may include an integrated circuit that realizes the functions of each of the learning mode processing unit 1 and the identification mode processing unit 2.

Alternatively, the speaker identification device in the present embodiment 1 may include a program that corresponds to one of the learning mode processing unit 1 and the identification mode processing unit 2, an integrated circuit that realizes the other function, and a processor. In such a case, one from among the learning mode processing unit 1 and the identification mode processing unit 2 functions as a result of the processor executing the program that corresponds to the one from among the learning mode processing unit 1 and the identification mode processing unit 2.

It should be noted that the speaker identification device in the present embodiment 1 can switch between the learning mode processing performed by the learning mode processing unit 1 and the identification mode processing performed by the identification mode processing unit 2. The switching between the learning mode processing and the identification mode processing is performed with an input operation by the user, for example. The speaker identification device may switch between the learning mode processing and the identification mode processing by receiving the pressing of a switching button by the user, for example. Furthermore, the speaker identification device may switch between the learning mode processing and the identification mode processing by voice recognition being performed with respect to speech by the user, for example.

The voice input unit 11 is constituted by a microphone, for example, and, in the learning mode processing or the identification mode processing, collects ambient voice and converts the collected voice into a voice signal that is output.

In the learning mode processing, the first voice analysis unit 12 analyzes the voice signal that has been input from the voice input unit 11, and outputs a voice signal that has been spoken by a first speaker. The first voice analysis unit 12 acquires a voice signal of a first speaker who is not stored in the first speaker model storage unit 13.

The first speaker model storage unit 13 associates and stores a plurality of unspecified speakers and a plurality of unspecified speaker models obtained by modeling the features of the voices of the plurality of unspecified speakers. The plurality of unspecified speaker models may each include feature values specific to the unspecified speakers by using a probability model according to a Gaussian mixture model (GMM) or the like, for example.

The first similarity degree calculation unit 14 calculates first similarity degrees between a feature value in the acquired voice signal of the first speaker and each feature value in the plurality of unspecified speaker models stored in the first speaker model storage unit 13.

The first similarity degree calculation unit 14 calculates a feature value in the acquired voice signal of the first speaker. Here, the feature value is calculated using iVector. It should be noted that the method for calculating a feature value using iVector is a conventional technique, and therefore a detailed description thereof is omitted. Furthermore, the method for calculating a feature value is not limited to iVector, and another calculation method may be used. Furthermore, the first similarity degree calculation unit 14 reads a plurality of unspecified speaker models stored in the first speaker model storage unit 13, and calculates feature values in the read plurality of unspecified speaker models.

It should be noted that the first speaker model storage unit 13 may store, in advance, feature values that have been calculated with respect to the plurality of unspecified speaker models, in association with the plurality of unspecified speaker models. In the case where the first speaker model storage unit 13 stores feature values, the first similarity degree calculation unit 14 reads feature values from the first speaker model storage unit 13.

The first similarity degree calculation unit 14 calculates first similarity degrees between a feature value in the voice signal of the first speaker and each feature value in the plurality of unspecified speaker models stored in the first speaker model storage unit 13. The first similarity degree calculation unit 14 calculates an inter-speaker distance that indicates the extent to which two feature values (the feature value in the voice signal of the first speaker and a feature value in an unspecified speaker model in the first speaker model storage unit 13) are similar.

Furthermore, the first similarity degree calculation unit 14 may calculate, as the inter-speaker distance, a numerical value (likelihood) that indicates the likelihood of it being inferred that the feature value in the voice signal of the first speaker constitutes each of the feature values in the unspecified speaker models, for example. The first similarity degree calculation unit 14 uses a function for calculating the closeness between two feature values to calculate the inter-speaker distance. The inter-speaker distance is a value that becomes closer to 1 as the degree to which the feature values are similar increases, and becomes closer to 0 as the degree to which the feature values are similar decreases. It should be noted that the method for calculating the similarity degree is a conventional technique, and therefore a detailed description thereof is omitted. Furthermore, the method for calculating the similarity degree is not limited to the aforementioned.

The model specifying unit 15 specifies a plurality of the unspecified speaker models for which the first similarity degrees calculated by the first similarity degree calculation unit 14 are equal to or greater than a prescribed value. The model specifying unit 15 extracts the specified plurality of unspecified speaker models from the first speaker model storage unit 13. The model specifying unit 15 associates and stores identification information that identifies first speakers and the specified plurality of unspecified speaker models in the second speaker model storage unit 16. It should be noted that the model specifying unit 15 creates identification information for each input voice.

The second speaker model storage unit 16 stores and associates the identification information that identifies the first speakers and the plurality of unspecified speaker models specified by the model specifying unit 15.

In the identification mode processing, the second voice analysis unit 17 analyzes the voice signal that has been input from the voice input unit 11, and outputs a voice signal that has been spoken by a second speaker. The second voice analysis unit 17 acquires the voice signal of the second speaker. The second speaker is the same speaker as a first speaker or is a different speaker from the first speakers. The second voice analysis unit 17 performs the same processing as the first voice analysis unit 12.

The second similarity degree calculation unit 18 calculates, for each of the first speakers, a plurality of second similarity degrees between a feature value in the voice signal of the second speaker acquired by the second voice analysis unit 17, and each feature value in the plurality of unspecified speaker models associated with the first speakers and stored in the second speaker model storage unit 16 (second database).

The second similarity degree calculation unit 18 calculates a feature value in the acquired voice signal of the second speaker. Here, the feature value is calculated using iVector. It should be noted that the method for calculating a feature value using iVector is a conventional technique, and therefore a detailed description thereof is omitted. Furthermore, the method for calculating a feature value is not limited to iVector, and another calculation method may be used. Furthermore, the second similarity degree calculation unit 18 may calculate a feature value using the same calculation method as the feature value calculation method employed by the first similarity degree calculation unit 14, or may calculate a feature value using a different calculation method from the feature value calculation method employed by the first similarity degree calculation unit 14.

Furthermore, the second similarity degree calculation unit 18 reads the plurality of unspecified speaker models associated with each of the plurality of first speakers stored in the second speaker model storage unit 16, and calculates a feature value in the read plurality of unspecified speaker models, for each first speaker.

It should be noted that the second speaker model storage unit 16 may store, in advance, feature values that have been calculated with respect to the plurality of unspecified speaker models, in association with the plurality of unspecified speaker models. In the case where the second speaker model storage unit 16 stores feature values, the second similarity degree calculation unit 18 reads the feature values from the second speaker model storage unit 16.

The second similarity degree calculation unit 18 calculates, for each of the first speakers, a plurality of second similarity degrees between a feature value in the voice signal of the second speaker, and each feature value in the plurality of unspecified speaker models associated with the first speakers and stored in the second speaker model storage unit 16. The second similarity degree calculation unit 18 calculates an inter-speaker distance that indicates the extent to which two feature values are similar. The second similarity degree calculation unit 18 uses a function for calculating the closeness between two feature values to calculate the inter-speaker distance. The inter-speaker distance is a value that becomes close to 1 when the feature values are similar, and becomes close to 0 when the feature values are not similar. It should be noted that the method for calculating the similarity degree is a conventional technique, and therefore a detailed description thereof is omitted. Furthermore, the method for calculating the similarity degree is not limited to the aforementioned.

Furthermore, the second similarity degree calculation unit 18 may calculate the second similarity degrees using the same calculation method as the first similarity degree calculation method employed by the first similarity degree calculation unit 14, or may calculate the second similarity degrees using a different calculation method from the first similarity degree calculation method employed by the first similarity degree calculation unit 14.

The speaker identification unit 19 specifies one of the first speakers stored in the second speaker model storage unit 16 who corresponds to the second speaker, on the basis of the plurality of second similarity degrees calculated by the second similarity degree calculation unit 18. Here, the speaker identification unit 19 calculates, for each of the first speakers, a total value obtained by totaling the plurality of second similarity degrees calculated by the second similarity degree calculation unit 18, and specifies which of the first speakers stored in the second speaker model storage unit 16 corresponds to the second speaker, on the basis of the calculated total value. The speaker identification unit 19 specifies the second speaker as the first speaker stored in the second speaker model storage unit 16 having the highest calculated total value.

In this way, by comparing total values of similarity degrees, it is possible to increase the precision of speaker identification without being affected by differences in vocabulary and shortness of sentences.

It should be noted that, in the present embodiment 1, a terminal device such as a television or a smartphone may be provided with the voice input unit 11, and the speaker identification device may be provided with a configuration other than the voice input unit 11. In such a case, the speaker identification device is constituted by a server, for example, and is communicably connected to the terminal device via a network. The server may be provided with a portion or the entirety of the functions of the speaker identification device.

Furthermore, the first speakers and the second speaker may be users who operate a household electrical appliance arranged inside a household, for example.

Next, the operation of each of the learning mode processing and the identification mode processing of the speaker identification device in the present embodiment 1 will be described. FIG. 2 is a flowchart for describing a learning mode processing operation of the speaker identification device in the present embodiment 1.

First, in step S1, the first voice analysis unit 12 acquires a voice signal of a first speaker who is not stored in the first speaker model storage unit 13.

Next, in step S2, the first similarity degree calculation unit 14 calculates a feature value of the voice signal of the first speaker acquired by the first voice analysis unit 12, and feature values of a plurality of unspecified speaker models stored in the first speaker model storage unit 13.

Next, in step S3, the first similarity degree calculation unit 14 calculates first similarity degrees between the calculated feature value of the voice signal of the first speaker and the calculated feature values of the plurality of unspecified speaker models.

Next, in step S4, the model specifying unit 15 specifies a plurality of the unspecified speaker models for which the first similarity degree calculated by the first similarity degree calculation unit 14 is equal to or greater than a prescribed value. The model specifying unit 15 extracts the specified plurality of unspecified speaker models from the first speaker model storage unit 13. At such time, the model specifying unit 15 may extract the specified plurality of unspecified speaker models from the first speaker model storage unit 13 in descending order of the first similarity degrees.

Next, in step S5, the model specifying unit 15 stores the specified plurality of unspecified speaker models in the second speaker model storage unit 16 in association with the identification information that identifies the first speaker.

FIG. 3 is a flowchart for describing an identification mode processing operation of the speaker identification device in the present embodiment 1.

First, in step S11, the second voice analysis unit 17 acquires a voice signal of a second speaker.

Next, in step S12, the second similarity degree calculation unit 18 calculates a feature value of the voice signal of the second speaker acquired by the second voice analysis unit 17, and feature values of a plurality of unspecified speaker models associated with each of a plurality of first speakers and stored in the second speaker model storage unit 16.

Next, in step S13, the second similarity degree calculation unit 18 calculates, for each of the first speakers, a plurality of second similarity degrees between the feature value of the voice signal of the second speaker and each of the feature values of the plurality of unspecified speaker models associated with the first speakers.

Next, in step S14, the speaker identification unit 19 calculates, for each of the first speakers, a total value obtained by totaling the plurality of second similarity degrees calculated by the second similarity degree calculation unit 18.

Next, in step S15, the speaker identification unit 19 specifies the second speaker as the first speaker stored in the second speaker model storage unit 16 having the highest calculated total value.

It should be noted that, after the identification mode processing has been performed, the speaker identification unit 19 may compare the first similarity degrees corresponding to each of the unspecified speaker models calculated in the learning mode processing, and the second similarity degrees corresponding to each of the unspecified speaker models calculated in the identification mode processing. Then, in the case where there is a prescribed number or more of unspecified speaker models for which the difference between the first similarity degrees and the second similarity degrees is equal to or greater than a prescribed value, the speaker identification unit 19 may instruct the learning mode processing unit 1 to perform the learning mode processing again, and the learning mode processing unit 1 may perform the learning mode processing again.

Furthermore, after the identification mode processing has been performed, the speaker identification unit 19 may compare the first similarity degrees corresponding to each of the unspecified speaker models calculated in the learning mode processing, and the second similarity degrees corresponding to each of the unspecified speaker models calculated in the identification mode processing. Then, in the case where there is a prescribed number or more of the unspecified speaker models for which the difference between the first similarity degrees and the second similarity degrees is equal to or greater than the prescribed value, the speaker identification unit 19 may amend the first similarity degrees corresponding to the unspecified speaker models stored in the second speaker model storage unit 16 for which the difference is equal to or greater than the prescribed value to the second similarity degrees calculated in the identification mode processing.

Next, a specific processing flow of the speaker identification device in the present embodiment 1 will be described.

Figure 4:
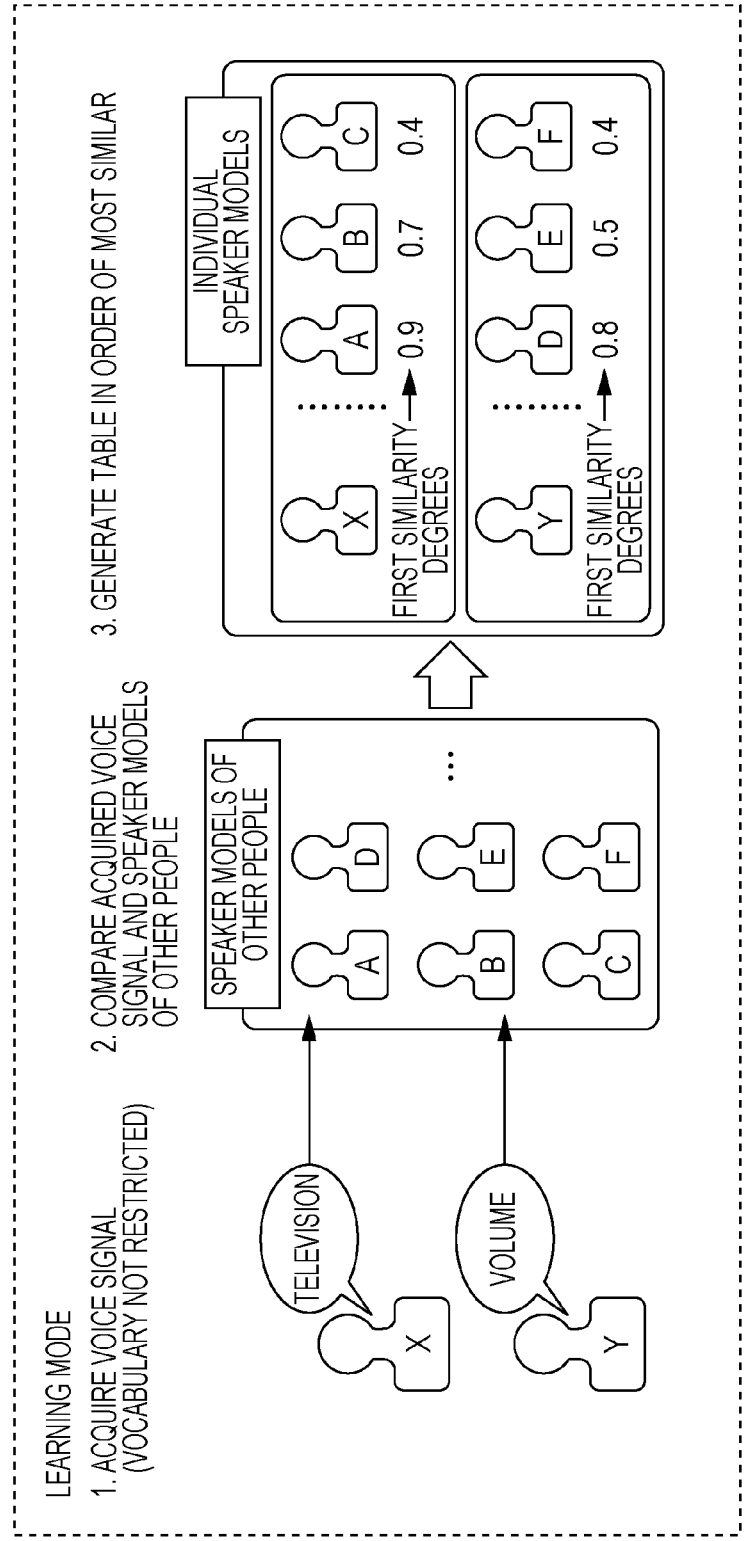
FIG. 4 is a schematic drawing for describing a specific processing example of the learning mode processing of the speaker identification device in embodiment 1.

FIG. 4 is a schematic drawing for describing a specific processing example of the learning mode processing of the speaker identification device in the present embodiment 1.

First, in the learning mode processing, in the case where a first speaker X has spoken "television", the voice input unit 11 collects the voice spoken by the first speaker X, and converts the collected voice into a voice signal that is output. It should be noted that, in the present embodiment 1, the vocabulary spoken by the first speaker X is not particularly restricted, and it is not necessary for the first speaker X to speak predetermined vocabulary. The first voice analysis unit 12 analyzes the voice signal that has been input from the voice input unit 11, and outputs a voice signal that has been spoken by the first speaker X.

Next, the first similarity degree calculation unit 14 compares the acquired voice signal of the first speaker X and speaker models of other people. In other words, the first similarity degree calculation unit 14 calculates first similarity degrees between a feature value in the acquired voice signal of the first speaker X and each feature value in a plurality of unspecified speaker models A to F stored in the first speaker model storage unit 13.

Next, the model specifying unit 15 specifies a plurality of the unspecified speaker models for which the first similarity degree calculated by the first similarity degree calculation unit 14 is equal to or greater than a prescribed value. In FIG. 4, the plurality of unspecified speaker models A to C for which the first similarity degree is 0.4 or greater are specified. For example, the first similarity degree between the voice signal of the first speaker X and the unspecified speaker model A is 0.9, the first similarity degree between the voice signal of the first speaker X and the unspecified speaker model B is 0.7, and the first similarity degree between the voice signal of the first speaker X and the unspecified speaker model C is 0.4. The model specifying unit 15 stores a table, in which identification information that identifies the first speaker X and the specified plurality of unspecified speaker models A to C are associated, in the second speaker model storage unit 16.

Similarly, in the learning mode processing, in the case where a first speaker Y has spoken "volume", the voice input unit 11 collects the voice spoken by the first speaker Y, and converts the collected voice into a voice signal that is output. The first voice analysis unit 12 analyzes the voice signal that has been input from the voice input unit 11, and outputs a voice signal that has been spoken by the first speaker Y.

Next, the first similarity degree calculation unit 14 compares the acquired voice signal of the first speaker Y and speaker models of other people. In other words, the first similarity degree calculation unit 14 calculates first similarity degrees between a feature value in the acquired voice signal of the first speaker Y and each feature value in the plurality of unspecified speaker models A to F stored in the first speaker model storage unit 13.

Next, the model specifying unit 15 specifies a plurality of the unspecified speaker models for which the first similarity degree calculated by the first similarity degree calculation unit 14 is equal to or greater than the prescribed value. In FIG. 4, the plurality of unspecified speaker models D to F for which the first similarity degree is 0.4 or greater are specified. For example, the first similarity degree between the voice signal of the first speaker Y and the unspecified speaker model D is 0.8, the first similarity degree between the voice signal of the first speaker Y and the unspecified speaker model E is 0.5, and the first similarity degree between the voice signal of the first speaker Y and the unspecified speaker model F is 0.4. The model specifying unit 15 stores a table, in which identification information that identifies the first speaker Y and the specified plurality of unspecified speaker models D to F are associated, in the second speaker model storage unit 16.

Figure 5:
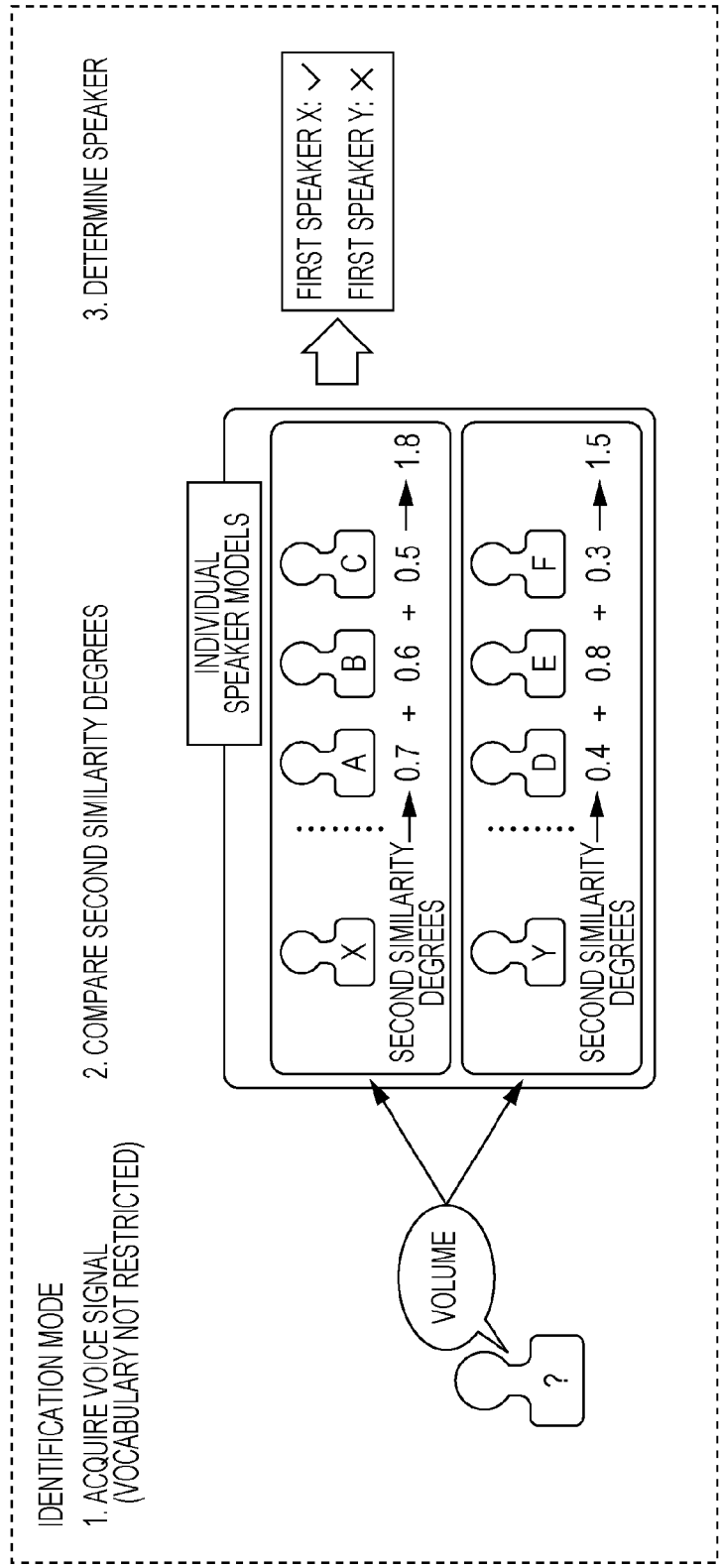
FIG. 5 is a schematic drawing for describing a specific processing example of the identification mode processing of the speaker identification device in embodiment 1.

FIG. 5 is a schematic drawing for describing a specific processing example of the identification mode processing of the speaker identification device in the present embodiment 1.

First, in the identification mode processing, in the case where a second speaker has spoken "volume", the voice input unit 11 collects the voice spoken by the second speaker, and converts the collected voice into a voice signal that is output. The second voice analysis unit 17 analyzes the voice signal that has been input from the voice input unit 11, and outputs a voice signal that has been spoken by the second speaker.

Next, the second similarity degree calculation unit 18 calculates a plurality of second similarity degrees between a feature value in the voice signal of the second speaker, and each feature value in the plurality of unspecified speaker models A to C associated with the first speaker X and stored in the second speaker model storage unit 16. Furthermore, the second similarity degree calculation unit 18 calculates a plurality of second similarity degrees between the feature value in the voice signal of the second speaker, and each feature value in the plurality of unspecified speaker models D to F associated with the first speaker Y and stored in the second speaker model storage unit 16.

Next, the speaker identification unit 19 calculates, for each of the first speakers, a total value obtained by totaling the plurality of second similarity degrees calculated by the second similarity degree calculation unit 18. In other words, the speaker identification unit 19 calculates a total value obtained by totaling the plurality of second similarity degrees between the voice signal of the second speaker and each of the plurality of unspecified speaker models A to C associated with the first speaker X. Furthermore, the speaker identification unit 19 calculates a total value obtained by totaling the plurality of second similarity degrees between the voice signal of the second speaker and each of the plurality of unspecified speaker models D to F associated with the first speaker Y.

For example, the second similarity degree between the voice signal of the second speaker and the unspecified speaker model A is 0.7, the second similarity degree between the voice signal of the second speaker and the unspecified speaker model B is 0.6, and the second similarity degree between the voice signal of the second speaker and the unspecified speaker model C is 0.5. Therefore, the total value of the plurality of second similarity degrees between the second speaker and the first speaker X is 0.7+0.6+ 0.5=1.8. Furthermore, the second similarity degree between the voice signal of the second speaker and the unspecified speaker model D is 0.4, the second similarity degree between the voice signal of the second speaker and the unspecified speaker model E is 0.8, and the second similarity degree between the voice signal of the second speaker and the unspecified speaker model F is 0.3. Therefore, the total value of the plurality of second similarity degrees between the second speaker and the first speaker Y is 0.4+0.8+ 0.3=1.5.

Next, the speaker identification unit 19 specifies which of the first speakers X and Y stored in the second speaker model storage unit 16 corresponds to the second speaker, on the basis of the calculated total values. The total value of the plurality of second similarity degrees between the second speaker and the first speaker X is 1.8, and the total value of the plurality of second similarity degrees between the second speaker and the first speaker Y is 1.5, the total value for the first speaker X being greater than the total value for the first speaker Y. Therefore, the speaker identification unit 19 determines that the second speaker is the first speaker X.

In this way, in the case where the second speaker is the first speaker X but the speaker model for the first speaker X has not been sufficiently learned, there is a risk of it not being possible to identify the second speaker using the speaker model. Thus, in the present embodiment, a plurality of unspecified speaker models of a plurality of unspecified speakers similar to the first speaker X are used, thereby making it possible to accurately identify the second speaker.

Furthermore, the second speaker is identified using the speaker models of a plurality of unspecified speakers similar to the voice signals of the first speakers, and therefore it is possible to identify an identification target speaker with even greater precision even in the case where a speaker model for the speaker has not been created.

Next, a first modified example of embodiment 1 will be described.

Figure 6:
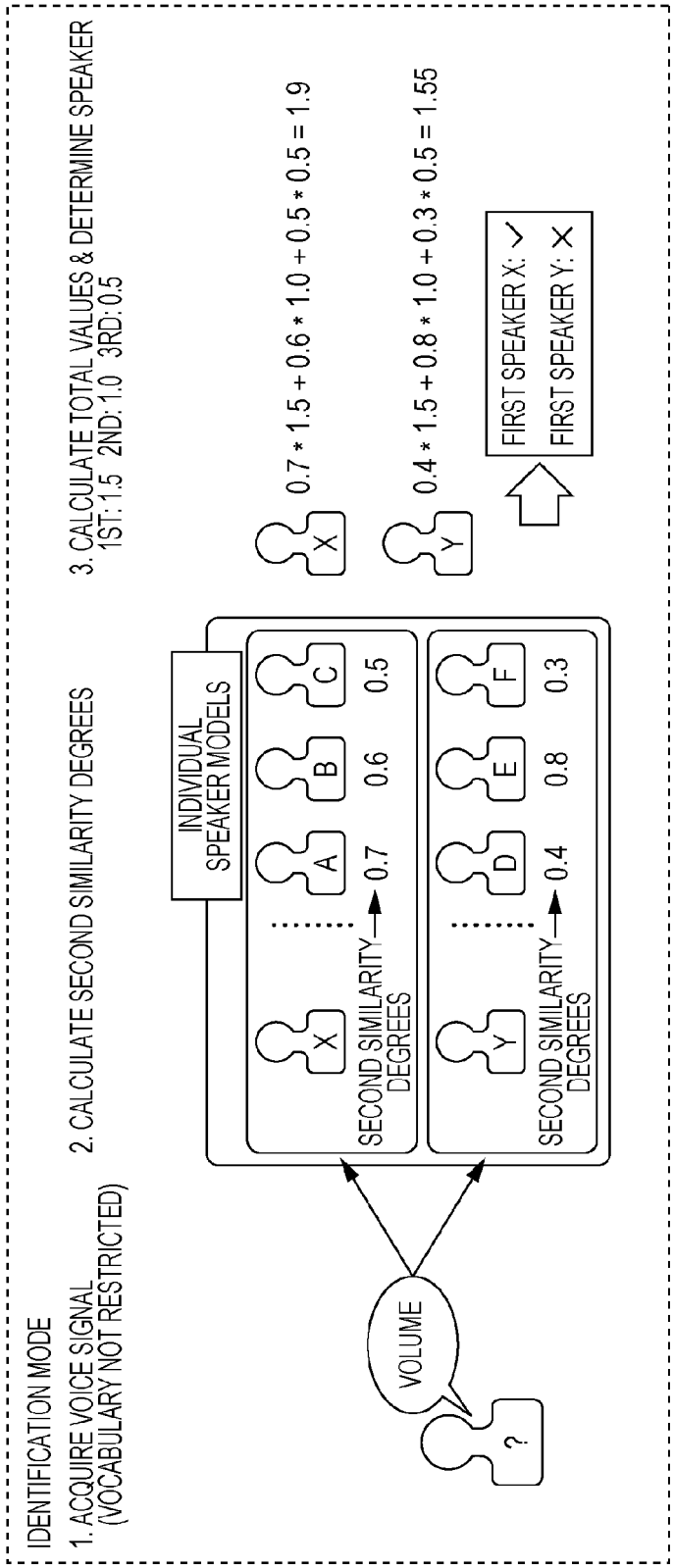
FIG. 6 is a schematic drawing for describing a specific processing example of the identification mode processing of the speaker identification device in a first modified example of embodiment 1.

FIG. 6 is a schematic drawing for describing a specific processing example of the identification mode processing of the speaker identification device in the first modified example of the present embodiment 1. It should be noted that the learning mode processing of the speaker identification device in the first modified example of the present embodiment 1 is the same as in the aforementioned embodiment 1, and therefore a description thereof is omitted.

In the first modified example of embodiment 1, rather than a plurality of second similarity degrees being merely totaled, a plurality of second similarity degrees obtained by multiplication with weighting values that correspond to the ranking of magnitude of the first similarity degrees are totaled.

In the identification mode processing in the first modified example of embodiment 1, in the case where a second speaker has spoken "volume", the voice input unit 11 collects the voice spoken by the second speaker, and converts the collected voice into a voice signal that is output. The second voice analysis unit 17 analyzes the voice signal that has been input from the voice input unit 11, and outputs a voice signal that has been spoken by the second speaker.

Next, the second similarity degree calculation unit 18 calculates a plurality of second similarity degrees between a feature value in the voice signal of the second speaker, and each feature value in a plurality of unspecified speaker models A to C associated with a first speaker X and stored in the second speaker model storage unit 16. Furthermore, the second similarity degree calculation unit 18 calculates a plurality of second similarity degrees between the feature value in the voice signal of the second speaker, and each feature value in a plurality of unspecified speaker models D to F associated with a first speaker Y and stored in the second speaker model storage unit 16.

Next, the speaker identification unit 19 corrects the plurality of second similarity degrees calculated by the second similarity degree calculation unit 18 by multiplying each of the plurality of second similarity degrees by a weighting value that corresponds to the ranking of the first similarity degrees. The weighting value increases as the first similarity degrees increase. For example, a weighting value of 1.5 is applied for the first similarity degree having the highest value from among the first similarity degrees of the plurality of unspecified speaker models associated with a first speaker, a weighting value of 1.0 is applied for the first similarity degree having the second highest value, and a weighting value of 0.5 is applied for the first similarity degree having the third highest value.

It should be noted that, in the learning mode processing, it is preferable that the model specifying unit 15 store the plurality of unspecified speaker models with respect to the first speakers in descending order of the first similarity degrees. Thus, in the identification mode processing, it is no longer necessary to calculate the first similarity degrees when the weighting values corresponding to the ranking of the first similarity degrees are to be determined, and it is possible for processing speed to be improved. Furthermore, in the learning mode processing, the model specifying unit 15 may store the calculated first similarity degrees in the second speaker model storage unit 16 in association with the plurality of unspecified speaker models. Furthermore, in the identification mode processing, the second similarity degree calculation unit 18 may calculate first similarity degrees between a feature value of a speaker model for a first speaker and feature values of the plurality of unspecified speaker models associated with the first speaker.

The speaker identification unit 19 calculates, for each of the first speakers X and Y, a total value obtained by totaling the corrected plurality of second similarity degrees.

For example, the second similarity degree between the voice signal of the second speaker and the unspecified speaker model A is 0.7, the second similarity degree between the voice signal of the second speaker and the unspecified speaker model B is 0.6, and the second similarity degree between the voice signal of the second speaker and the unspecified speaker model C is 0.5. Furthermore, the first similarity degree for the unspecified speaker model A is greater than the first similarity degree for the unspecified speaker model B, and the first similarity degree for the unspecified speaker model B is greater than the first similarity degree for the unspecified speaker model C. Furthermore, the weighting values are 1.5, 1.0, and 0.5 in descending order of the first similarity degrees. Therefore, the total value of the corrected plurality of second similarity degrees between the second speaker and the first speaker X is 0.7*1.5+0.6*1.0+0.5*0.5=1.9.

Furthermore, for example, the second similarity degree between the voice signal of the second speaker and the unspecified speaker model D is 0.4, the second similarity degree between the voice signal of the second speaker and the unspecified speaker model E is 0.8, and the second similarity degree between the voice signal of the second speaker and the unspecified speaker model F is 0.3. Furthermore, the first similarity degree for the unspecified speaker model D is greater than the first similarity degree for the unspecified speaker model E, and the first similarity degree for the unspecified speaker model E is greater than the first similarity degree for the unspecified speaker model F. Furthermore, the weighting values are 1.5, 1.0, and 0.5 in descending order of the first similarity degrees. Therefore, the total value of the corrected plurality of second similarity degrees between the second speaker and the first speaker Y is 0.4*1.5+0.8*1.0+0.3*0.5=1.55.

Next, the speaker identification unit 19 specifies which of the first speakers X and Y stored in the second speaker model storage unit 16 corresponds to the second speaker, on the basis of the calculated total values. The total value of the corrected plurality of second similarity degrees between the second speaker and the first speaker X is 1.9, and the total value of the corrected plurality of second similarity degrees between the second speaker and the first speaker Y is 1.55, the total value for the first speaker X being greater than the total value for the first speaker Y. Therefore, the speaker identification unit 19 determines that the second speaker is the first speaker X.

In this way, the plurality of second similarity degrees are corrected by each of the plurality of second similarity degrees being multiplied by a weighting value that corresponds to the ranking of the first similarity degrees, and therefore it is possible to suppress fluctuation in the second similarity degrees caused by differences in vocabulary, shortness of speech sentences, and so forth, and it is possible to identify a speaker with even greater precision.

Next, a second modified example of embodiment 1 will be described.

Figure 7:
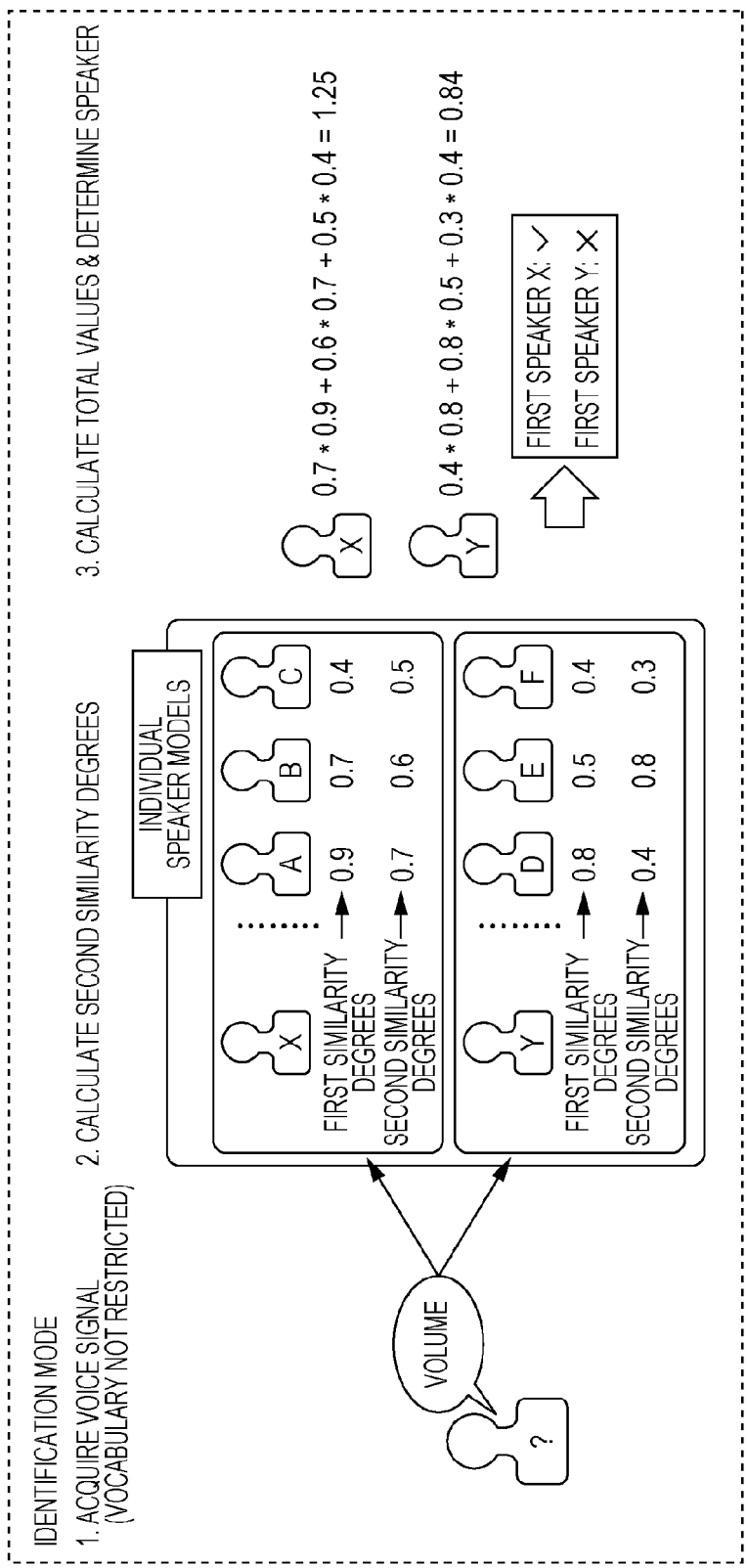
FIG. 7 is a schematic drawing for describing a specific processing example of the identification mode processing of the speaker identification device in a second modified example of embodiment 1.

FIG. 7 is a schematic drawing for describing a specific processing example of the identification mode processing of the speaker identification device in a second modified example of the present embodiment 1. It should be noted that the learning mode processing of the speaker identification device in the second modified example of the present embodiment 1 is the same as in the aforementioned embodiment 1, and therefore a description thereof is omitted.

In the second modified example of embodiment 1, rather than a plurality of second similarity degrees being merely totaled, a plurality of second similarity degrees obtained by multiplication with weighting values that correspond to the values of the first similarity degrees are totaled.

In the identification mode processing in the second modified example of embodiment 1, in the case where a second speaker has spoken "volume", the voice input unit 11 collects the voice spoken by the second speaker, and converts the collected voice into a voice signal that is output. The second voice analysis unit 17 analyzes the voice signal that has been input from the voice input unit 11, and outputs a voice signal that has been spoken by the second speaker.

Next, the second similarity degree calculation unit 18 calculates a plurality of second similarity degrees between a feature value in the voice signal of the second speaker, and each feature value in a plurality of unspecified speaker models A to C associated with a first speaker X and stored in the second speaker model storage unit 16. Furthermore, the second similarity degree calculation unit 18 calculates a plurality of second similarity degrees between the feature value in the voice signal of the second speaker, and each feature value in a plurality of unspecified speaker models D to F associated with a first speaker Y and stored in the second speaker model storage unit 16.

Next, the speaker identification unit 19 corrects the plurality of second similarity degrees by multiplying each of the plurality of second similarity degrees calculated by the second similarity degree calculation unit 18 by first similarity degrees. It should be noted that the first similarity degrees are stored in the second speaker model storage unit 16 in association with the plurality of unspecified speaker models.

The speaker identification unit 19 calculates, for each of the first speakers X and Y, a total value obtained by totaling the corrected plurality of second similarity degrees.

For example, the second similarity degree between the voice signal of the second speaker and the unspecified speaker model A is 0.7, the second similarity degree between the voice signal of the second speaker and the unspecified speaker model B is 0.6, and the second similarity degree between the voice signal of the second speaker and the unspecified speaker model C is 0.5. Furthermore, the first similarity degree associated with the unspecified speaker model A is 0.9, the first similarity degree associated with the unspecified speaker model B is 0.7, and the first similarity degree associated with the unspecified speaker model C is 0.4. Therefore, the total value of the corrected plurality of second similarity degrees between the second speaker and the first speaker X is 0.7*0.9+0.6*0.7+0.5*0.4=1.25.

Furthermore, for example, the second similarity degree between the voice signal of the second speaker and the unspecified speaker model D is 0.4, the second similarity degree between the voice signal of the second speaker and the unspecified speaker model E is 0.8, and the second similarity degree between the voice signal of the second speaker and the unspecified speaker model F is 0.3. Furthermore, the first similarity degree associated with the unspecified speaker model D is 0.8, the first similarity degree associated with the unspecified speaker model E is 0.5, and the first similarity degree associated with the unspecified speaker model F is 0.4. Therefore, the total value of the corrected plurality of second similarity degrees between the second speaker and the first speaker Y is 0.4*0.8+0.8*0.5+0.3*0.4=0.84.

Next, the speaker identification unit 19 specifies which of the first speakers X and Y stored in the second speaker model storage unit 16 corresponds to the second speaker, on the basis of the calculated total values. The total value of the corrected plurality of second similarity degrees between the second speaker and the first speaker X is 1.25, and the total value of the corrected plurality of second similarity degrees between the second speaker and the first speaker Y is 0.84, the total value for the first speaker X being greater than the total value for the first speaker Y. Therefore, the speaker identification unit 19 determines that the second speaker is the first speaker X.

In this way, the plurality of second similarity degrees are corrected by each of the plurality of second similarity degrees being multiplied by a first similarity degree, and therefore it is possible to suppress fluctuation in the second similarity degrees caused by differences in vocabulary, shortness of speech sentences, and so forth, and it is possible to identify a speaker with even greater precision.

Next, a third modified example of embodiment 1 will be described.

Figure 8:
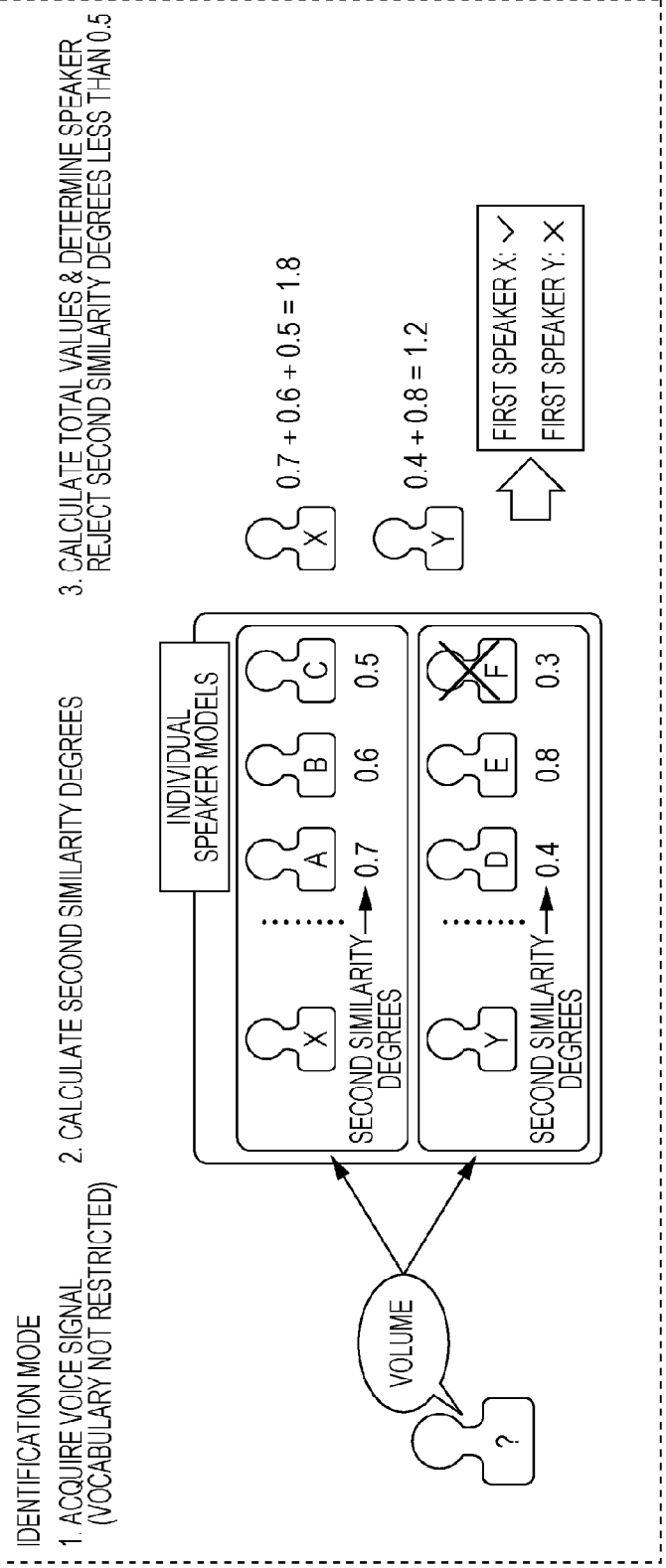
FIG. 8 is a schematic drawing for describing a specific processing example of the identification mode processing of the speaker identification device in a third modified example of embodiment 1.

FIG. 8 is a schematic drawing for describing a specific processing example of the identification mode processing of the speaker identification device in the third modified example of the present embodiment 1. It should be noted that the learning mode processing of the speaker identification device in the third modified example of the present embodiment 1 is the same as in the aforementioned embodiment 1, and therefore a description thereof is omitted.

In the third modified example of embodiment 1, rather than a plurality of second similarity degrees being merely totaled, a plurality of second similarity degrees that are equal to or greater than a prescribed value are totaled.

In the identification mode processing in the third modified example of embodiment 1, in the case where a second speaker has spoken "volume", the voice input unit 11 collects the voice spoken by the second speaker, and converts the collected voice into a voice signal that is output. The second voice analysis unit 17 analyzes the voice signal that has been input from the voice input unit 11, and outputs a voice signal that has been spoken by the second speaker.

Next, the second similarity degree calculation unit 18 calculates a plurality of second similarity degrees between a feature value in the voice signal of the second speaker, and each feature value in a plurality of unspecified speaker models A to C associated with a first speaker X and stored in the second speaker model storage unit 16. Furthermore, the second similarity degree calculation unit 18 calculates a plurality of second similarity degrees between the feature value in the voice signal of the second speaker, and each feature value in a plurality of unspecified speaker models D to F associated with a first speaker Y and stored in the second speaker model storage unit 16.

Next, the speaker identification unit 19 calculates, for each of the first speakers, a total value obtained by totaling a plurality of the second similarity degrees that are equal to or greater than a prescribed value from among the plurality of second similarity degrees calculated by the second similarity degree calculation unit 18. In other words, the speaker identification unit 19 calculates a total value obtained by totaling the plurality of second similarity degrees that are equal to or greater than the prescribed value from among the plurality of second similarity degrees between the voice signal of the second speaker and the plurality of unspecified speaker models A to C associated with the first speaker X. Furthermore, the speaker identification unit 19 calculates a total value obtained by totaling the plurality of second similarity degrees that are equal to or greater than the prescribed value from among the plurality of second similarity degrees between the voice signal of the second speaker and the plurality of unspecified speaker models D to F associated with the first speaker Y.

For example, the speaker identification unit 19 rejects second similarity degrees that are less than 0.5, and totals a plurality of second similarity degrees that are 0.5 or greater. For example, the second similarity degree between the voice signal of the second speaker and the unspecified speaker model A is 0.7, the second similarity degree between the voice signal of the second speaker and the unspecified speaker model B is 0.6, and the second similarity degree between the voice signal of the second speaker and the unspecified speaker model C is 0.5. Therefore, the total value of the plurality of second similarity degrees between the second speaker and the first speaker X is 0.7+0.6+0.5=1.8.

Furthermore, for example, the second similarity degree between the voice signal of the second speaker and the unspecified speaker model D is 0.4, the second similarity degree between the voice signal of the second speaker and the unspecified speaker model E is 0.8, and the second similarity degree between the voice signal of the second speaker and the unspecified speaker model F is 0.3. Therefore, the total value of the plurality of second similarity degrees between the second speaker and the first speaker Y is 0.4+0.8=1.2.

Next, the speaker identification unit 19 specifies which of the first speakers X and Y stored in the second speaker model storage unit 16 corresponds to the second speaker, on the basis of the calculated total values. The total value of the plurality of second similarity degrees between the second speaker and the first speaker X is 1.8, and the total value of the plurality of second similarity degrees between the second speaker and the first speaker Y is 1.2, the total value for the first speaker X being greater than the total value for the first speaker Y. Therefore, the speaker identification unit 19 determines that the second speaker is the first speaker X.

In this way, the plurality of second similarity degrees that are equal to or greater than the prescribed value are totaled, the second similarity degrees that are less than the prescribed value are not taken into consideration, and therefore it is possible to identify a speaker with even greater precision.

Embodiment 2

Figure 9:
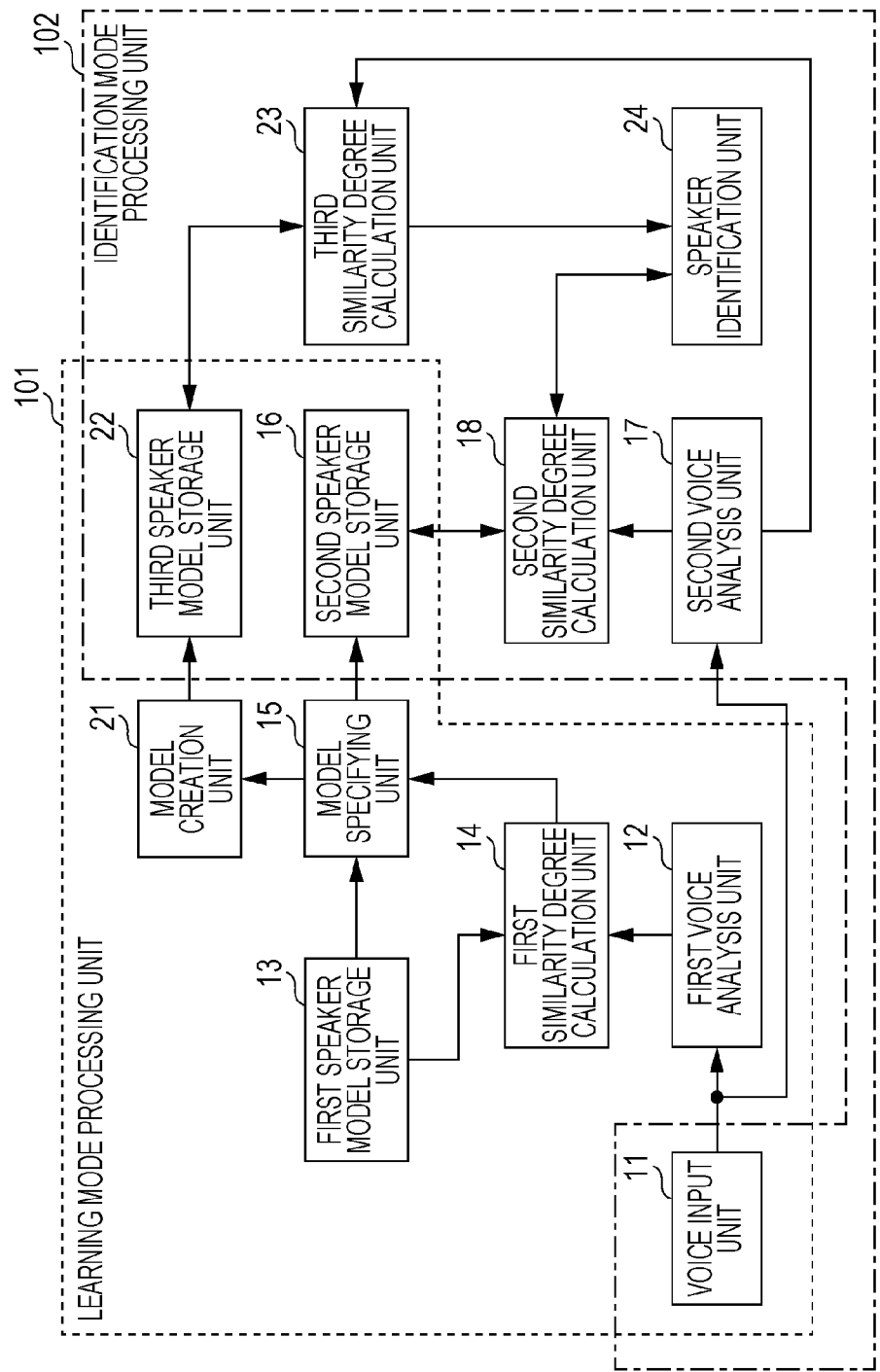
FIG. 9 is a drawing depicting a configuration of a speaker identification device in embodiment 2.

FIG. 9 is a drawing depicting a configuration of a speaker identification device in the present embodiment 2. The speaker identification device is housed inside a television, a smartphone, a car navigation device, or the like.

The speaker identification device depicted in FIG. 9 is provided with a voice input unit 11, a first voice analysis unit 12, a first speaker model storage unit 13, a first similarity degree calculation unit 14, a model specifying unit 15, a second speaker model storage unit 16, a second voice analysis unit 17, a second similarity degree calculation unit 18, a model creation unit 21, a third speaker model storage unit 22, a third similarity degree calculation unit 23, and a speaker identification unit 24.

Furthermore, a learning mode processing unit 101 is made up of the voice input unit 11, the first voice analysis unit 12, the first speaker model storage unit 13, the first similarity degree calculation unit 14, the model specifying unit 15, the second speaker model storage unit 16, the model creation unit 21, and the third speaker model storage unit 22. An identification mode processing unit 102 is made up of the voice input unit 11, the second speaker model storage unit 16, the second voice analysis unit 17, the second similarity degree calculation unit 18, the third speaker model storage unit 22, the third similarity degree calculation unit 23, and the speaker identification unit 24.

It should be noted that, in the present embodiment 2, configurations that are the same as in embodiment 1 are denoted by the same reference numbers and descriptions thereof are omitted.

The model creation unit 21 newly creates speaker models that correspond to first speakers, on the basis of a plurality of unspecified speaker models specified by the model specifying unit 15 and acquired voice signals of the first speakers. For example, the model creation unit 21 averages the plurality of unspecified speaker models specified by the model specifying unit 15 and the acquired voice signals of the first speakers, and creates averaged speaker models as new speaker models corresponding to the first speakers. In the present embodiment 1, new speaker models are created by performing averaging; however, it should be noted that the present disclosure is not particularly limited thereto, and new speaker models may be created by another method. The model creation unit 21 associates and stores identification information that identifies the first speakers and the created speaker models in the third speaker model storage unit 22.

The third speaker model storage unit 22 associates and stores the identification information that identifies the first speakers and the speaker models created by the model creation unit 21.

The third similarity degree calculation unit 23 calculates, for each of the first speakers, a third similarity degree between a feature value in the voice signal of the second speaker acquired by the second voice analysis unit 17, and a feature value in the speaker model associated with the first speaker and stored in the third speaker model storage unit 22 (third database).

The third similarity degree calculation unit 23 calculates a feature value in the acquired voice signal of the second speaker. Here, the feature value is calculated using iVector. It should be noted that the method for calculating a feature value using iVector is a conventional technique, and therefore a detailed description thereof is omitted. Furthermore, the method for calculating a feature value is not limited to iVector, and another calculation method may be used. Furthermore, the third similarity degree calculation unit 23 may calculate a feature value using the same calculation method as the feature value calculation method employed by the first similarity degree calculation unit 14 or the second similarity degree calculation unit 18, or may calculate a feature value using a different calculation method from the feature value calculation method employed by the first similarity degree calculation unit 14 or the second similarity degree calculation unit 18.

Furthermore, the third similarity degree calculation unit 23 reads the speaker models associated with each of the plurality of first speakers stored in the third speaker model storage unit 22, and calculates a feature value in the read speaker models, for each first speaker.

The third similarity degree calculation unit 23 calculates, for each of the first speakers, a third similarity degree between a feature value in the voice signal of the second speaker, and a feature value in the speaker model associated with the first speaker and stored in the third speaker model storage unit 22. The third similarity degree calculation unit 23 calculates an inter-speaker distance that indicates the extent to which the two feature values are similar. The third similarity degree calculation unit 23 uses a function for calculating the closeness between the two feature values to calculate the inter-speaker distance. The inter-speaker distance is a value that becomes close to 1 when the feature values are similar, and becomes close to 0 when the feature values are not similar. It should be noted that the method for calculating the similarity degree is a conventional technique, and therefore a detailed description thereof is omitted. Furthermore, the method for calculating the similarity degree is not limited to the aforementioned.

Furthermore, the third similarity degree calculation unit 23 may calculate the third similarity degree using the same calculation method as the first similarity degree calculation method employed by the first similarity degree calculation unit 14 or the second similarity degree calculation method employed by the second similarity degree calculation unit 18, or may calculate the third similarity degree using a different calculation method from the first similarity degree calculation method employed by the first similarity degree calculation unit 14 or the second similarity degree calculation method employed by the second similarity degree calculation unit 18.

The speaker identification unit 24 specifies one of the first speakers stored in the third speaker model storage unit 22 who corresponds to the second speaker, on the basis of the third similarity degree calculated by the third similarity degree calculation unit 23. Here, the speaker identification unit 24 specifies the second speaker as the first speaker stored in the third speaker model storage unit 22 having the highest third similarity degree calculated by the third similarity degree calculation unit 23.

It should be noted that the speaker identification unit 24 may specify the second speaker as the first speaker for which the third similarity degree calculated by the third similarity degree calculation unit 23 is equal to or greater than a prescribed value and is the highest.

In the case where the second speaker is not specified as being any of the first speakers stored in the third speaker model storage unit 22, the second similarity degree calculation unit 18 calculates, for each of the first speakers, a plurality of second similarity degrees between a feature value in the voice signal of the second speaker acquired by the second voice analysis unit 17, and each feature value in the plurality of unspecified speaker models associated with the first speakers and stored in the second speaker model storage unit 16.

The speaker identification unit 24 specifies which of the first speakers stored in the second speaker model storage unit 16 corresponds to the second speaker, on the basis of the plurality of second similarity degrees calculated by the second similarity degree calculation unit 18.

Next, the operation of each of the learning mode processing and the identification mode processing of the speaker identification device in the present embodiment 2 will be described.

Figure 10:
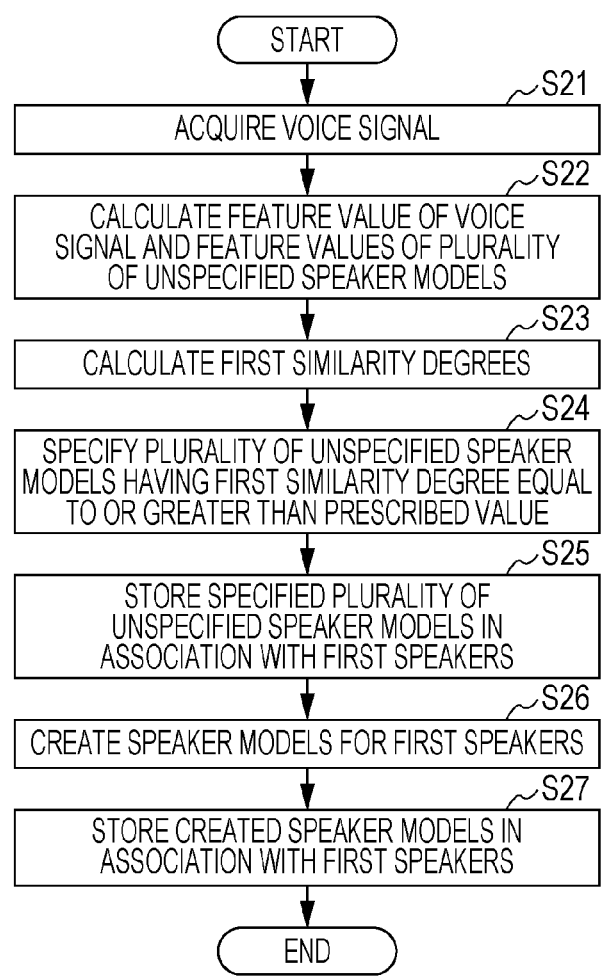
FIG. 10 is a flowchart for describing a learning mode processing operation of the speaker identification device in embodiment 2.

FIG. 10 is a flowchart for describing a learning mode processing operation of the speaker identification device in the present embodiment 2.

It should be noted that the processing of step S21 to step S25 depicted in FIG. 10 is the same as the processing of step S1 to step S5 depicted in FIG. 2, and therefore a description thereof is omitted.

In step S26, the model creation unit 21 newly creates speaker models that correspond to first speakers, on the basis of a plurality of unspecified speaker models specified by the model specifying unit 15 and acquired voice signals of the first speakers.

Next, in step S27, the model creation unit 21 associates and stores identification information that identifies the first speakers and the created speaker models in the third speaker model storage unit 22.

Figure 11:
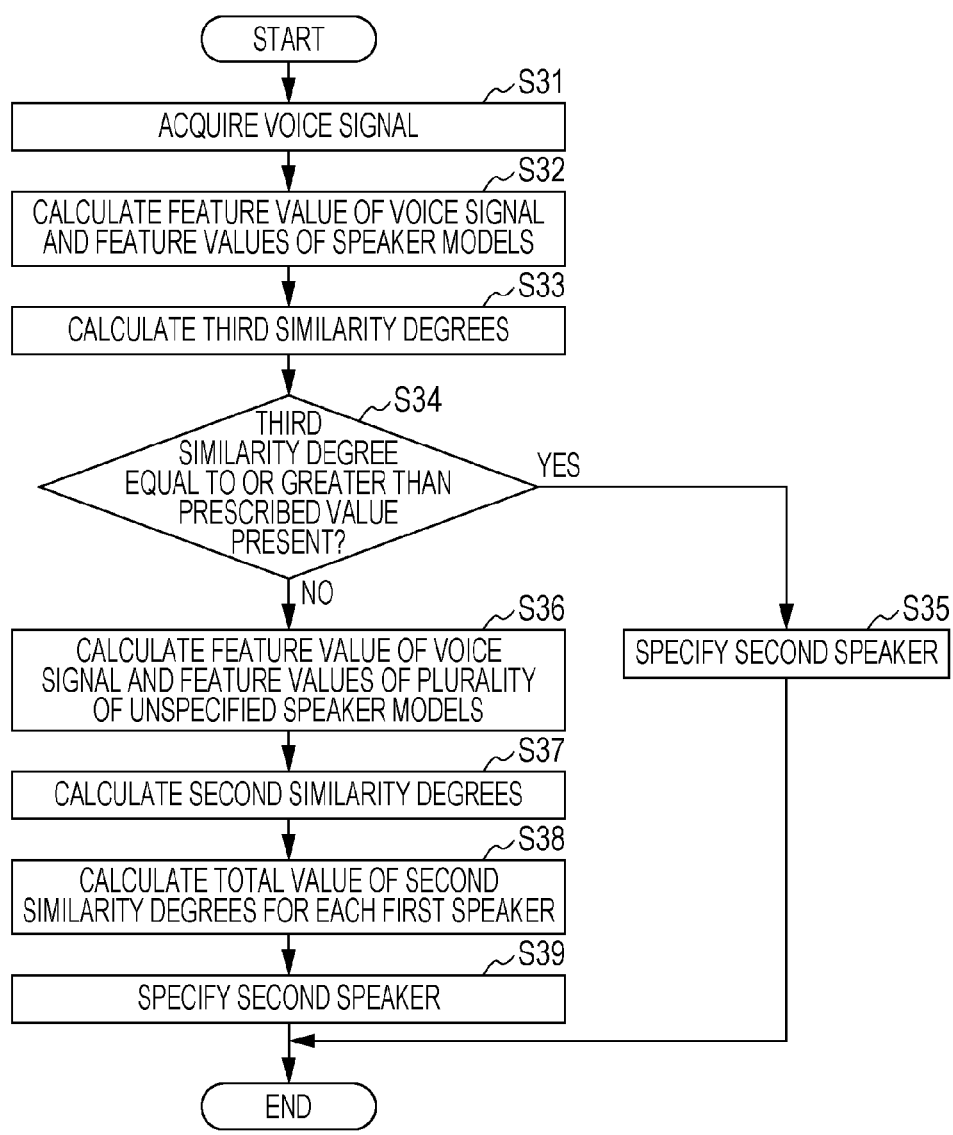
FIG. 11 is a flowchart for describing an identification mode processing operation of the speaker identification device in embodiment 2.

FIG. 11 is a flowchart for describing an identification mode processing operation of the speaker identification device in the present embodiment 2.

First, in step S31, the second voice analysis unit 17 acquires a voice signal of a second speaker.

Next, in step S32, the third similarity degree calculation unit 23 calculates a feature value of the voice signal of the second speaker acquired by the second voice analysis unit 17, and feature values of the speaker models associated with the first speakers and stored in the third speaker model storage unit 22.

Next, in step S33, the third similarity degree calculation unit 23 calculates, for each of the first speakers, a third similarity degree between the feature value of the voice signal of the second speaker and the feature value of the speaker model associated with the first speaker.

Next, in step S34, the speaker identification unit 24 determines whether or not there are third similarity degrees of a prescribed value or more among the plurality of calculated third similarity degrees. It should be noted that the prescribed value is a value with which it is possible to determine that two speaker models are similar, such as 0.5.

Here, in the case where it is determined that there are third similarity degrees of the prescribed value or more ("yes" in step S34), in step S35, the speaker identification unit 24 specifies the second speaker as being the first speaker corresponding to the third similarity degree having the highest value from among the third similarity degrees of the prescribed value or more.

However, in the case where it is determined that there are no third similarity degrees of the prescribed value or more ("no" in step S34), in step S36, the second similarity degree calculation unit 18 calculates a feature value of the voice signal of the second speaker acquired by the second voice analysis unit 17, and feature values of a plurality of the unspecified speaker models associated with each of the plurality of first speakers and stored in the second speaker model storage unit 16. It should be noted that the second similarity degree calculation unit 18 does not have to calculate the feature value of the voice signal of the second speaker since the feature value of the voice signal of the second speaker has already been calculated in step S32.

It should be noted that the processing of step S37 to step S39 depicted in FIG. 11 is the same as the processing of step S13 to step S15 depicted in FIG. 3, and therefore a description thereof is omitted.

Next, a specific processing flow of the speaker identification device in the present embodiment 2 will be described.

Figure 12:
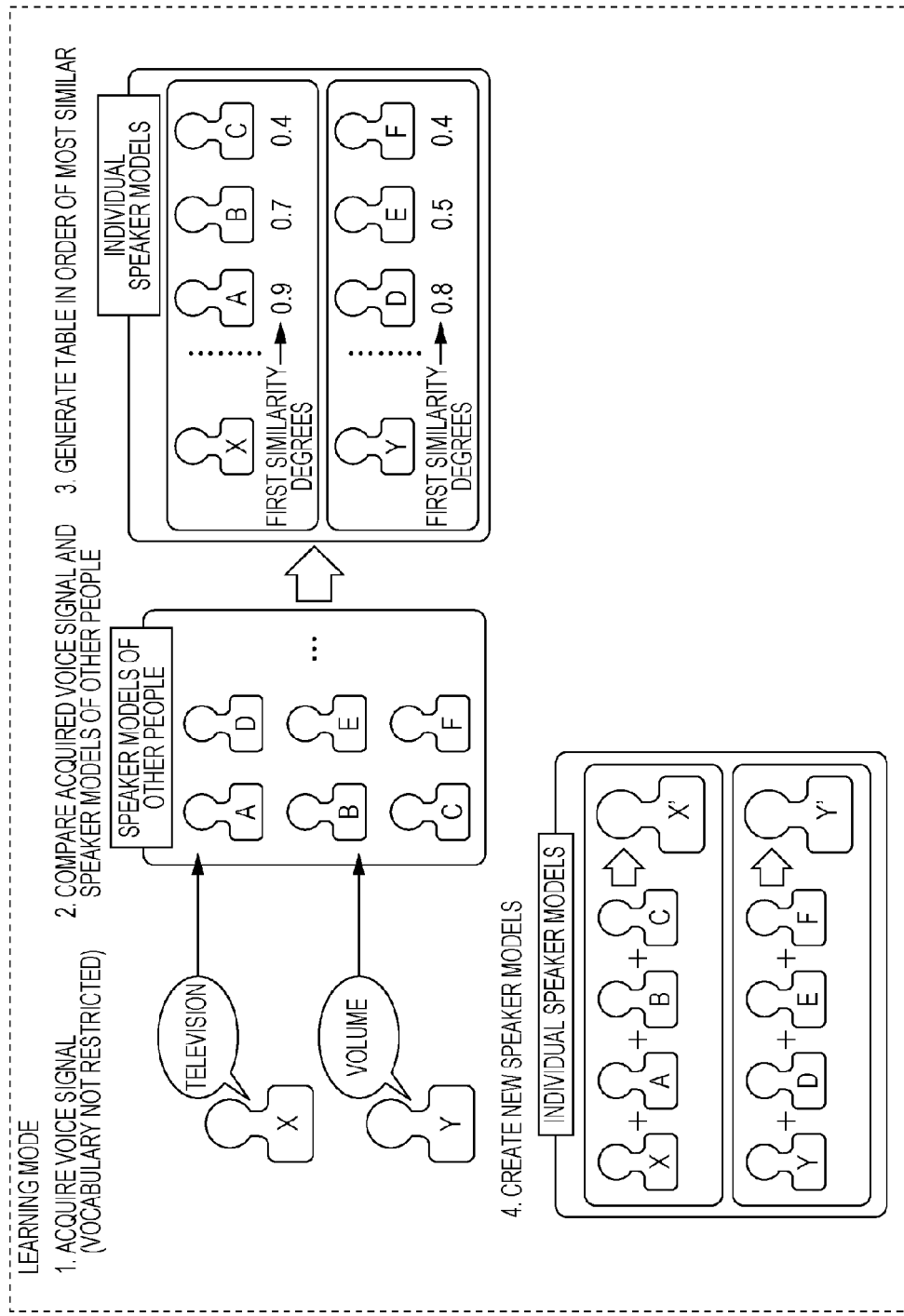
FIG. 12 is a schematic drawing for describing a specific processing example of the learning mode processing of the speaker identification device in embodiment 2.

FIG. 12 is a schematic drawing for describing a specific processing example of the learning mode processing of the speaker identification device in the present embodiment 2.

First, in the learning mode processing, in the case where a first speaker X has spoken "television", the voice input unit 11 collects the voice spoken by the first speaker X, and converts the collected voice into a voice signal that is output. It should be noted that, in the present embodiment 1, the vocabulary spoken by the first speaker X is not particularly restricted, and it is not necessary for the first speaker X to speak predetermined vocabulary. The first voice analysis unit 12 analyzes the voice signal that has been input from the voice input unit 11, and outputs a voice signal that has been spoken by the first speaker X.

Next, the first similarity degree calculation unit 14 compares the acquired voice signal of the first speaker X and speaker models of other people. In other words, the first similarity degree calculation unit 14 calculates first similarity degrees between a feature value in the acquired voice signal of the first speaker X and each feature value in a plurality of unspecified speaker models A to F stored in the first speaker model storage unit 13.

Next, the model specifying unit 15 specifies a plurality of the unspecified speaker models for which the first similarity degree calculated by the first similarity degree calculation unit 14 is equal to or greater than a prescribed value. In FIG. 12, the plurality of unspecified speaker models A to C for which the first similarity degree is 0.4 or greater are specified. For example, the first similarity degree between the voice signal of the first speaker X and the unspecified speaker model A is 0.9, the first similarity degree between the voice signal of the first speaker X and the unspecified speaker model B is 0.7, and the first similarity degree between the voice signal of the first speaker X and the unspecified speaker model C is 0.4. The model specifying unit 15 stores a table, in which identification information that identifies the first speaker X and the specified plurality of unspecified speaker models A to C are associated, in the second speaker model storage unit 16.

Next, the model creation unit 21 newly creates a speaker model X' that corresponds to the first speaker X, on the basis of the plurality of unspecified speaker models A to C specified by the model specifying unit 15 and the acquired voice signal of the first speaker X. The model creation unit 21 associates and stores identification information that identifies the first speaker X and the newly created speaker model X' that corresponds to the first speaker X, in the third speaker model storage unit 22.

Similarly, in the learning mode processing, in the case where a first speaker Y has spoken "volume", the voice input unit 11 collects the voice spoken by the first speaker Y, and converts the collected voice into a voice signal that is output. The first voice analysis unit 12 analyzes the voice signal that has been input from the voice input unit 11, and outputs a voice signal that has been spoken by the first speaker Y.

Next, the first similarity degree calculation unit 14 compares the acquired voice signal of the first speaker Y and the speaker models of other people. In other words, the first similarity degree calculation unit 14 calculates first similarity degrees between a feature value in the acquired voice signal of the first speaker Y and each feature value in the plurality of unspecified speaker models A to F stored in the first speaker model storage unit 13.

Next, the model specifying unit 15 specifies a plurality of the unspecified speaker models for which the first similarity degree calculated by the first similarity degree calculation unit 14 is equal to or greater than the prescribed value. In FIG. 12, the plurality of unspecified speaker models D to F for which the first similarity degree is 0.4 or greater are specified. For example, the first similarity degree between the voice signal of the first speaker Y and the unspecified speaker model D is 0.8, the first similarity degree between the voice signal of the first speaker Y and the unspecified speaker model E is 0.5, and the first similarity degree between the voice signal of the first speaker Y and the unspecified speaker model F is 0.4. The model specifying unit 15 stores a table, in which identification information that identifies the first speaker Y and the specified plurality of unspecified speaker models D to F are associated, in the second speaker model storage unit 16.

Next, the model creation unit 21 newly creates a speaker model Y' that corresponds to the first speaker Y, on the basis of the plurality of unspecified speaker models D to F specified by the model specifying unit 15 and the acquired voice signal of the first speaker Y. The model creation unit 21 associates and stores identification information that identifies the first speaker Y and the newly created speaker model Y' that corresponds to the first speaker Y, in the third speaker model storage unit 22.

In this way, in the present embodiment 2, new speaker models that correspond to first speakers are created using a plurality of speaker models of other people similar to the acquired voice signal of the first speakers, and therefore it is possible to identify a speaker with even greater precision using the newly created speaker models.

Embodiment 3

Figure 13:
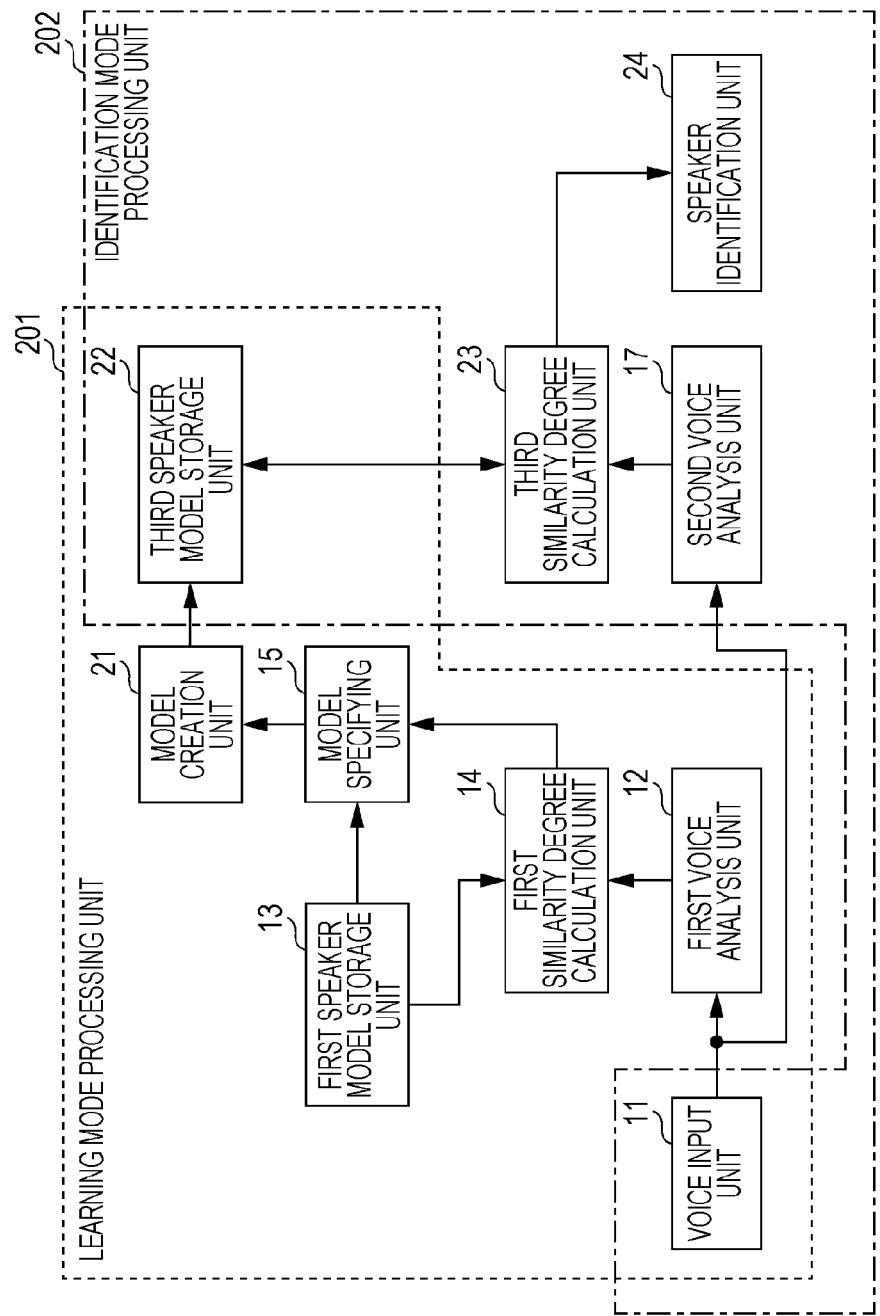
FIG. 13 is a drawing depicting a configuration of a speaker identification device in embodiment 3.

FIG. 13 is a drawing depicting a configuration of a speaker identification device in the present embodiment 3. The speaker identification device is housed inside a television, a smartphone, a car navigation device, or the like.

The speaker identification device depicted in FIG. 13 is provided with a voice input unit 11, a first voice analysis unit 12, a first speaker model storage unit 13, a first similarity degree calculation unit 14, a model specifying unit 15, a second voice analysis unit 17, a model creation unit 21, a third speaker model storage unit 22, a third similarity degree calculation unit 23, and a speaker identification unit 24.

Furthermore, a learning mode processing unit 201 is made up of the voice input unit 11, the first voice analysis unit 12, the first speaker model storage unit 13, the first similarity degree calculation unit 14, the model specifying unit 15, the model creation unit 21, and the third speaker model storage unit 22. An identification mode processing unit 202 is made up of the voice input unit 11, the second voice analysis unit 17, the third speaker model storage unit 22, the third similarity degree calculation unit 23, and the speaker identification unit 24.

It should be noted that, in the present embodiment 3, configurations that are the same as in embodiment 1 and embodiment 2 are denoted by the same reference numbers and descriptions thereof are omitted.

Embodiment 3 is different from embodiment 2 in that the speaker identification device of embodiment 3 is not provided with the second speaker model storage unit 16 or the second similarity degree calculation unit 18 of embodiment 2. In embodiment 3, the model specifying unit 15 does not store a specified plurality of unspecified speaker models in the second speaker model storage unit 16 in association with the identification information that identifies a first speaker. Therefore, in the identification mode processing of embodiment 3, a speaker is identified using only speaker models that are newly created based on a specified plurality of unspecified speaker models and a voice signal of a second speaker.

The model creation unit 21 newly creates speaker models that correspond to first speakers, on the basis of a plurality of unspecified speaker models specified by the model specifying unit 15 and acquired voice signals of the first speakers. The model creation unit 21 associates and stores identification information that identifies the first speakers and the created speaker models in the third speaker model storage unit 22.

The third speaker model storage unit 22 may be a memory, for example, as the hardware configuration thereof. The memory is a writable recording medium such as a semiconductor memory or a hard disk.

The third similarity degree calculation unit 23 calculates, for each of the first speakers, a third similarity degree between a feature value in the voice signal of a second speaker acquired by the second voice analysis unit 17, and a feature value in the speaker model associated with the first speaker and stored in the third speaker model storage unit 22 (third database).

The speaker identification unit 24 specifies one of the first speakers stored in the third speaker model storage unit 22 who corresponds to the second speaker, on the basis of the third similarity degree calculated by the third similarity degree calculation unit 23.

Next, the operation of each of the learning mode processing and the identification mode processing of the speaker identification device in the present embodiment 3 will be described.

Figure 14:
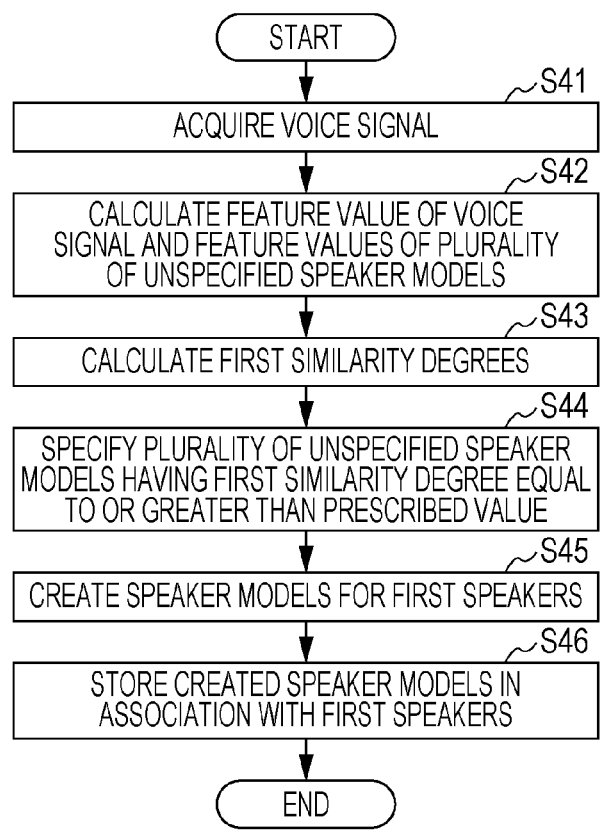
FIG. 14 is a flowchart for describing a learning mode processing operation of the speaker identification device in embodiment 3.

FIG. 14 is a flowchart for describing a learning mode processing operation of the speaker identification device in the present embodiment 3.

It should be noted that the processing of step S41 to step S44 depicted in FIG. 14 is the same as the processing of step S1 to step S4 depicted in FIG. 2, and therefore a description thereof is omitted.

In step S45, the model creation unit 21 newly creates speaker models that correspond to first speakers, on the basis of a plurality of unspecified speaker models specified by the model specifying unit 15 and acquired voice signals of the first speakers.

Next, in step S46, the model creation unit 21 associates and stores identification information that identifies the first speakers and the created speaker models in the third speaker model storage unit 22.

Figure 15:
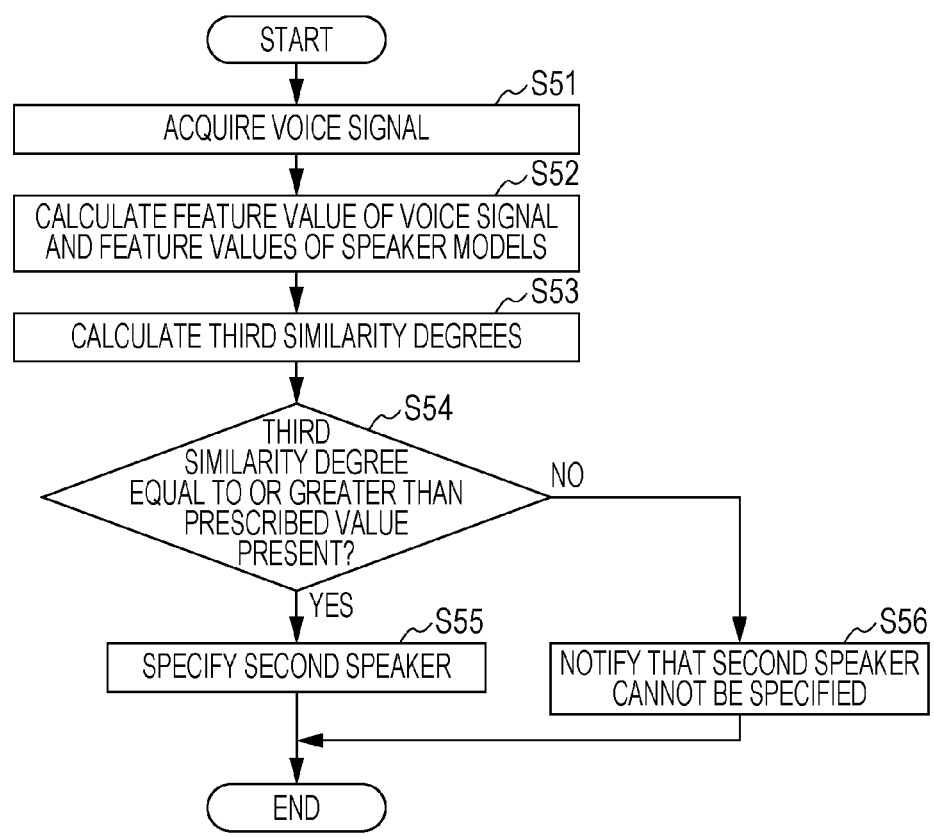
FIG. 15 is a flowchart for describing an identification mode processing operation of the speaker identification device in embodiment 3.

FIG. 15 is a flowchart for describing an identification mode processing operation of the speaker identification device in the present embodiment 3.

It should be noted that the processing of step S51 to step S55 depicted in FIG. 15 is the same as the processing of step S31 to step S35 depicted in FIG. 11, and therefore a description thereof is omitted.

In the case where it is determined that there are no third similarity degrees of a prescribed value or more in step S54 ("no" in step S54), in step S56, the speaker identification unit 24 provides notification that a second speaker cannot be specified. In the case where the speaker identification device is provided with a display unit, the speaker identification unit 24 displays a screen indicating that the second speaker cannot be specified, on the display unit. Furthermore, in the case where the speaker identification device is provided with a sound output unit, the speaker identification unit 24 outputs a sound indicating that the second speaker cannot be specified, from the sound output unit. It should be noted that, in the case where it is determined that there are no third similarity degrees of the prescribed value or more, processing may be terminated without providing notification that the second speaker cannot be specified.

In this way, in the present embodiment 3, new speaker models that correspond to first speakers are created using a plurality of speaker models of other people similar to the acquired voice signals of the first speakers, and therefore it is possible to identify a speaker with even greater precision using the newly created speaker models.

It should be noted that, in the aforementioned embodiments, the constituent elements may be configured by using dedicated hardware, or may be realized by executing a software program suitable for the constituent elements. The operations or functions of the constituent elements may be realized by a program execution unit such as a CPU or a processor reading and executing a software program recorded in a recording medium such as a hard disk or a semiconductor memory.

The data that is used when the operations or functions of the constituent elements are realized may be recorded in a writable recording medium such as a semiconductor memory or a hard disk.

A speaker identification method and a speaker identification device according to the present disclosure can identify an identification target speaker with even greater precision even in the case where a speaker model for the speaker has not been created, and are useful as a speaker identification method and a speaker identification device with which a speaker is identified on the basis of an acquired voice signal.

What is claimed is:

1. A speaker identification method, comprising:
    executing, using a processor, learning mode processing using a first database, in which a plurality of unspecified speakers and a plurality of unspecified speaker models obtained by modeling features of voices of the plurality of unspecified speakers are associated and stored, is used to create a second database, in which first speakers who are not stored in the first database and a plurality of the unspecified speaker models are associated and stored; and
    executing, using the processor, identification mode processing in which the second database is used to identify a second speaker,
    wherein, in the executing of the learning mode processing,
        a voice signal of each of the first speakers is acquired,
        first similarity degrees between a feature value in the acquired voice signal of each of the first speakers and each feature value in the plurality of unspecified speaker models stored in the first database are calculated,
        a plurality of the unspecified speaker models for which the calculated first similarity degrees are equal to or greater than a prescribed value are specified, and
        each of the first speakers and the specified plurality of unspecified speaker models are associated and stored in the second database, and
    in the executing of the identification mode processing,
        a voice signal of the second speaker is acquired,
        a plurality of second similarity degrees between a feature value in the acquired voice signal of the second speaker and each feature value in the plurality of unspecified speaker models associated with the first speakers and stored in the second database are calculated for each of the first speakers,
        the calculated plurality of second similarity degrees are corrected by multiplying each of the plurality of second similarity degrees by a weighting value that corresponds to a ranking of the first similarity degrees,
        a total value obtained by totaling the corrected plurality of second similarity degrees is calculated for each of the first speakers, and
        one of the first speakers stored in the second database who corresponds to the second speaker is specified based on the calculated total values.

2. The speaker identification method according to claim 1, wherein the weighting value increases as the first similarity degrees increase.

3. The speaker identification method according to claim 1, wherein a total value obtained by totaling the plurality of second similarity degrees that are equal to or greater than a prescribed value from among the calculated plurality of second similarity degrees is calculated for each of the first speakers, and the one of the first speakers stored in the second database who corresponds to the second speaker is specified based on the calculated total values.

4. The speaker identification method according to claim 1, wherein the second speaker is specified as the one of the first speakers stored in the second database having the highest calculated total value.

5. The speaker identification method according to claim 1, wherein, in the executing of the learning mode processing,
    speaker models corresponding to the first speakers are newly created based on the specified plurality of unspecified speaker models and the acquired voice signals of the first speakers, and
    the created speaker models are associated with the first speakers and stored in a third database, and
    in the executing of the identification mode processing,
    for each first speaker, a third similarity degree between a feature value in the acquired voice signal of the second speaker and a feature value in the speaker model associated with the first speaker and stored in the third database is calculated, and
    one of the first speakers stored in the third database who corresponds to the second speaker is specified based on the calculated third similarity degrees.

6. The speaker identification method according to claim 5, wherein, in a case where the second speaker is not specified as being any of the first speakers stored in the third database, the plurality of second similarity degrees between the feature value in the acquired voice signal of the second speaker and each feature value in the plurality of unspecified speaker models associated with the first speakers and stored in the second database are calculated for each of the first speakers, and
    the one of the first speakers stored in the second database who corresponds to the second speaker is specified based on the calculated plurality of second similarity degrees.

7. The speaker identification method according to claim 1, wherein, after the identification mode processing has been performed, the first similarity degrees corresponding to each of the unspecified speaker models calculated in the learning mode processing and the second similarity degrees corresponding to each of the unspecified speaker models calculated in the identification mode processing are compared, and
    in a case where there is a prescribed number or more of the unspecified speaker models for which a difference between the first similarity degrees and the second similarity degrees is equal to or greater than a prescribed value, the learning mode processing is performed again.

8. The speaker identification method according to claim 1, wherein, after the identification mode processing has been performed, the first similarity degrees corresponding to each of the unspecified speaker models calculated in the learning mode processing and the second similarity degrees corresponding to each of the unspecified speaker models calculated in the identification mode processing are compared, and
    in a case where there is a prescribed number or more of the unspecified speaker models for which a difference between the first similarity degrees and the second similarity degrees is equal to or greater than a prescribed value, the first similarity degrees corresponding to the unspecified speaker models stored in the second database for which the difference is equal to or greater than the prescribed value are amended to the second similarity degrees calculated in the identification mode processing.

9. A speaker identification device comprising:
a processor; and
a memory that stores a program,
wherein the program causes the processor to
execute a learning mode processing using a first database, in which a plurality of unspecified speakers and a plurality of unspecified speaker models obtained by modeling features of voices of the plurality of unspecified speakers are associated and stored, to create a second database, in which first speakers who are not stored in the first database and a plurality of the unspecified speaker models are associated and stored and
execute an identification mode processing using the second database to identify a second speaker,
wherein, in the execution of the learning mode processing,
a voice signal of each of the first speakers is acquired,
first similarity degrees between a feature value in the voice signal of each of the first speakers acquired by the first voice acquirer and each feature value in the plurality of unspecified speaker models stored in the first database are calculated,
a plurality of the unspecified speaker models for which the first similarity degrees calculated by the first similarity degree calculator are equal to or greater than a prescribed value are specified, and
each of the first speakers and the plurality of unspecified speaker models specified by the first specifier in the second database are associated and stored in the second database, and
in the execution of the identification mode processing,
a voice signal of the second speaker is acquired,
a plurality of second similarity degrees between a feature value in the voice signal of the second speaker acquired by the second voice acquirer and each feature value in the plurality of unspecified speaker models associated with the first speakers and stored in the second database are calculated for each of the first speakers,
the calculated plurality of second similarity degrees are corrected by multiplying each of the plurality of second similarity degrees by a weighting value that corresponds to a ranking of the first similarity degrees,
a total value obtained by totaling the corrected plurality of second similarity degrees is calculated for each of the first speakers, and
one of the first speakers stored in the second database who corresponds to the second speaker is specified based on the calculated total values.

10. A speaker identification method, comprising:
executing, using a processor, learning mode processing using a first database, in which a plurality of unspecified speakers and a plurality of unspecified speaker models obtained by modeling features of voices of the plurality of unspecified speakers are associated and stored, is used to create a second database, in which first speakers who are not stored in the first database and a plurality of the unspecified speaker models are associated and stored; and
executing, using the processor, identification mode processing in which the second database is used to identify a second speaker,
wherein, in the executing of the learning mode processing,
a voice signal of each of the first speakers is acquired,
first similarity degrees between a feature value in the acquired voice signal of each of the first speakers and each feature value in the plurality of unspecified speaker models of a plurality of the unspecified speakers who are different from the first speakers and are stored in the first database are calculated,
a plurality of the unspecified speaker models for which the calculated first similarity degrees are equal to or greater than a prescribed value are specified,
a speaker model corresponding to each of the first speakers is newly created based on the specified plurality of the unspecified speaker models and the acquired voice signals of the first speakers, and
the created speaker model is associated with the first speakers and stored in the second database, and
in the executing of the identification mode processing,
a voice signal of the second speaker is acquired,
a plurality of second similarity degrees between a feature value in the acquired voice signal of the second speaker and feature values in the speaker models associated with the first speakers and stored in the second database are calculated for each of the first speakers,
the calculated plurality of second similarity degrees are corrected by multiplying each of the plurality of second similarity degrees by a weighting value that corresponds to a ranking of the first similarity degrees,
a total value obtained by totaling the corrected plurality of second similarity degrees is calculated for each of the first speakers, and
one of the first speakers stored in the second database who corresponds to the second speaker is specified based on the calculated total values.

* * * * *